(12) United States Patent
Demptos et al.

(10) Patent No.: US 6,676,198 B2
(45) Date of Patent: Jan. 13, 2004

(54) MOUNTING SYSTEM AND VEHICLE SEAT ASSEMBLY INCLUDING THE SAME

(75) Inventors: Philippe Demptos, Bloomfield Hills, MI (US); Donald Sharnowski, Clinton Township, MI (US)

(73) Assignee: Faurecia Automotive Seating Canada Limited, Mississauga (CA)

( * ) Notice: Subject to any disclaimer, the term of this patent is extended or adjusted under 35 U.S.C. 154(b) by 0 days.

(21) Appl. No.: 10/251,952

(22) Filed: Sep. 23, 2002

(65) Prior Publication Data

US 2003/0107232 A1 Jun. 12, 2003

Related U.S. Application Data

(60) Provisional application No. 60/336,686, filed on Dec. 7, 2001.

(51) Int. Cl.[7] .................................................. B60N 2/00
(52) U.S. Cl. ........................ 296/187.03; 296/68.1; 296/65.01; 296/65.09
(58) Field of Search .......................... 296/187.03, 63, 296/65.01, 68.1, 65.09, 65.05, 65.16

(56) References Cited

U.S. PATENT DOCUMENTS

| 5,498,051 | A | | 3/1996 | Sponsler | |
| 5,915,779 | A | * | 6/1999 | Duchateau | 296/65.16 |
| 6,142,552 | A | * | 11/2000 | Husted et al. | 296/65.09 |
| 6,220,665 | B1 | | 4/2001 | Dingel | |
| 6,394,525 | B1 | | 5/2002 | Seibold | |
| 6,582,003 | B2 | * | 6/2003 | Fourrey et al. | 296/65.09 |
| 6,595,588 | B2 | * | 7/2003 | Ellerich et al. | 296/68.1 |

* cited by examiner

*Primary Examiner*—Dennis H. Pedder
*Assistant Examiner*—Jason Morrow
(74) *Attorney, Agent, or Firm*—Patrick J. Hofbauer

(57) ABSTRACT

A mounting system comprises a mount, a latch, an engaging member, a pin and a plate. The mount is mounted to a vehicle, defines a lateral axis and has a first portion of an object mounted thereto, for pivotal movement of the object about the axis to a design position, whereat the latch, which is connected to a second portion of the object, selectively engages with the engaging member, which is mounted on said vehicle. The plate presents a slot and, on opposite longitudinal sides of the slot, a pair of contiguous sockets. The pin is connected to the second portion and travels into the slot to a closed end of the slot during movement of the object to its design position. The sockets permit, through deformation of the object, longitudinal movement of the pin thereinto to a rearward limit position and a frontward limit position, respectively.

32 Claims, 22 Drawing Sheets

MOUNTING SYSTEM AND VEHICLE SEAT ASSEMBLY INCLUDING THE SAME

CROSS-REFERENCE TO CO-PENDING APPLICATIONS

This application claims the benefit of U.S. Provisional Application No. 60/336,686, filed Dec. 7, 2001.

FIELD OF THE INVENTION

The present invention relates to a mounting system for use with a vehicle and an object to be mounted on the vehicle, such as a vehicle seat, and more particularly, to a mounting system for a vehicle seat. The invention also includes a vehicle seat assembly including the mounting system.

BACKGROUND OF THE INVENTION

Passenger vehicles commonly have "tumble-forward" seats. Such seats are constructed so that they can be moved to an up-ended condition, so as to facilitate ingress and egress to and from the interior space in the vehicle to the rear of the seat. For this purpose, the seat frame is pivotally attached to the vehicle floor adjacent the seat front end and is releasably attached to the vehicle floor adjacent the seat rear end. Exemplary in this regard is U.S. Pat. No. 6,220,665 (Dingel et al.), issued Apr. 24, 2001.

Tumble-forward seats are often provided with folding functionality which permits the seat back to be folded forwardly to a collapsed position, whereat the seat back rests upon the seat cushion. Seats provided with this functionality ("fold and tumble seats") are advantageous since, when the seat back is at its collapsed position, release of the seat rear end permits the seat to be pivoted forwardly to an upfolded position, whereat the seat cushion is orientated substantially vertically, without the seat back projecting into the front portion of the vehicle interior. U.S. Pat. No. 5,498,051 (Sponsler et al.), issued Mar. 12, 1996 is exemplary in this regard.

The rear end of a typical tumble-forward seat (whether of the fold and tumble subspecies or not) is mounted to the vehicle floor by a pair of laterally-spaced latch hooks which are pivotable to respective engaged positions to engage corresponding mounting lugs presented by the vehicle floor. Exemplary in this regard is U.S. Pat. No. 5,498,051 (Sponsler et al.), issued Mar. 12, 1996. As is well-known in the art, the latch hooks forming said pair are typically connected to one another for simultaneous actuation, by a system of slave rods, slave cables or the like, to facilitate "single handle release" functionality, which among other things, improves the ergonomics of the design, with resultant consumer acceptance. In the Sponsler et al. reference, for example, a tie rod operatively couples a pair of cams, each of which act on a lobe formed on a respective latch hook to cause movement between engaged and disengaged positions thereof.

Devices which utilize only a single latch hook to mount the rear end of the seat to the vehicle are known in the prior art. This avoids the cost, weight and reliability issues associated with complicated systems of slave rods or the like, and achieves the desired single handle release functionality. However, in order to ensure that the seat does not become disengaged, particularly during frontal crash conditions, when loadings can be extreme, the construction of both the latch and the seat frame in such devices is typically more robust than that characteristic of devices incorporating paired latches ("paired-latch seat assemblies"), which can have adverse impacts upon cost, if the seat frame is made more robust by the incorporation therein of advanced materials and manufacturing techniques, or can have adverse affects upon weight if the seat frame is made more robust by the provision of larger, more robust components. For example, in U.S. Pat. No. 6,394,525 (Siebold), issued May 28, 2002, a relatively large pivot tube is employed.

SUMMARY OF THE INVENTION

It is an object of the present invention to provide a mounting system which can be used with a seat member to provide a tumble-forward seat assembly which has single-handle release functionality and which is relatively economical to manufacture, relatively lightweight and relatively reliable in operation.

This object, among others, is achieved by the present invention.

According to one aspect, the invention comprises a mounting system for use with a vehicle and an object to be mounted on the vehicle, the object having a first portion and a second portion and the vehicle having a front end, a rear end, a longitudinal axis extending between the front end and the rear end and a lateral axis arranged substantially transverse to the longitudinal axis.

The mounting system comprises a mounting means for defining a lateral first pivot axis proximate to the vehicle and for mounting the first portion of the object on the vehicle for pivotal movement of the object about the first pivot axis to a design position.

The mounting system further comprises a latch member, a latch-engaging member, a striker pin and a striker plate.

The latch member, in use, is mounted on the second portion of the object.

The latch-engaging member, in use, is mounted on said vehicle and is adapted to selectively, securely engage with the latch member when the object at its design position.

The striker pin, in use, is rigidly mounted on the second portion of the object in laterally-spaced relation to the latch member.

The striker plate presents a slot having an open end and a closed end and further presents a socket arranged to one side of the slot and contiguous therewith. The striker plate is mounted, in use, on said vehicle at an operative position whereat the socket is disposed frontwardly relative to the slot and whereat the striker pin travels into the open end of the slot and along said slot to a design position, adjacent the closed end of the slot and longitudinally rearwardly adjacent to the socket, during said pivotal movement of the object to its design position.

The socket is shaped and dimensioned so as to permit, in use, under frontal crash conditions of the vehicle and by agency of deformation of said object, frontward longitudinal movement of the striker pin thereinto to a frontward limit position whereat the striker plate contacts the striker pin to arrest further frontward longitudinal movement of the striker pin.

According to another aspect of the invention, preferably, the striker plate presents a pair of sockets arranged in substantially opposed relation on opposite sides of the slot and contiguous therewith, the pair of sockets, in use, being disposed on opposite longitudinal sides of the slot and each being shaped and dimensioned so as to permit, in use, under rear and frontal crash conditions of the vehicle and by agency of deformation of said object, longitudinal movement of the striker pin thereinto to a rearward limit position and the frontward limit position, respectively, whereat the striker plate contacts the striker pin to arrest further longitudinal movement of the striker pin.

According to other aspects of the invention, the latch member preferably comprises a first latch hook pivotally mounted on the second portion of the object for selective movement between an engaged position and a disengaged position and the latch-engaging member comprises a lug member, the lug member being adapted to be selectively, securely engaged by the first latch hook upon movement of the first latch hook from the disengaged position to the engaged position.

According to another aspect, the invention also comprises a seat assembly to be mounted on a vehicle having a front end, a rear end, a longitudinal axis extending between the front end and the rear end and a lateral axis arranged substantially transverse to the longitudinal axis.

The seat assembly comprises a seat member including a support member having a first portion and a second portion. The seat assembly further comprises the aforesaid mounting system, in use with the seat member in such manner that the first portion of the support member defines the first portion of the object, the second portion of the support member defines the second portion of the object and the design position of the seat member is an occupiable position.

As other aspects, the first latch hook is preferably adapted to move from its engaged position towards its disengaged position under frontal deformation of the seat assembly into a deformed configuration, and a second latch hook is provided, which is pivotally mounted on the second portion of the support member for selective movement between an engageable position, whereat it securely engages the lug member when the seat assembly is in its deformed configuration, and a disengaged position, whereat it is removed from engagement with the lug member.

According to other aspects of the invention, the seat member preferably includes a seat cushion portion and a seat back portion, each of the support member, the seat cushion portion and the seat back portion having respective design positions defined by the design position of the seat member.

According to another aspect, the seat member preferably defines a second pivot axis which, when the seat cushion portion is disposed at its design position, is aligned substantially laterally and disposed adjacent the rear end of the seat cushion portion.

According to another aspect, the seat member is preferably adapted to provide for selective, reversible forward pivotal movement of the seat back portion, relative to the seat cushion portion and about the second pivot axis, from its design position to a collapsed position whereat it rests upon the seat cushion portion when the seat cushion portion is disposed at its design position.

According to another aspect of the invention, the seat member is preferably adapted to provide, when the seat back portion is disposed at its collapsed position, for contemporaneous, selective, reversible forward pivotal movement of the support member, the seat back portion and the seat cushion portion about the first pivot axis to respective upfolded positions, whereat the seat cushion portion is orientated substantially vertically and the seat back portion is disposed substantially frontwardly from the seat cushion portion.

According to another aspect of the invention, the seat cushion portion is preferably detachably connected to the support member and is adapted for movement, independent of the seat back portion and the support member, between its design position and a storage position, which is relatively frontwardly disposed from the design position of the seat cushion portion and whereat the seat cushion portion is orientated substantially vertically.

According to another aspect of the invention, when the seat cushion portion is at its storage position, the seat member is preferably adapted to provide for selective, reversible forward folding movement of the seat back portion about a lateral fourth pivot axis, disposed adjacent the second portion of the support member, from its design position to a fold-flat position whereat the seat back portion is nested rearwardly relative to the seat cushion portion and disposed in a substantially horizontal orientation.

According to another aspect of the invention, the seat member preferably further comprises a pair of seat back mounting assemblies, comprising a first seat back mounting assembly and a second seat back mounting assembly, each of said pair of seat back mounting assemblies including a distal portion securely attached to the seat back portion and a proximal portion mounted to the support member for pivotal movement about the fourth pivot axis, to provide for said selective pivotal movement of the seat back portion about the fourth pivot axis.

According to yet another aspect of the invention, preferably, the proximal portion of each seat back mounting assembly is a rotator arm and the distal portion is a seat back mounting bracket, the rotator arm and the seat back mounting bracket being mounted to one another for selective, relative pivotal movement about the second pivot axis, thereby to provide for said selective, reversible forward pivotal movement of the seat back portion about the second pivot axis.

According to other aspects of the invention, a guide slot is preferably formed through the rotator arm of the first seat back mounting assembly and a limit pin preferably rigidly extends from the support member into said guide slot.

The guide slot extends in an arcuate manner about the fourth pivot axis and circumscribes the movement of said rotator arm between a fold-flat position thereof, defined by the fold-flat position of the seat back portion, and a design position thereof, defined by the design position of the seat back portion.

According to yet another aspect of the invention, said selective, reversible forward folding movement of the seat back portion about the fourth pivot axis is preferably under control of a latch pawl, said latch pawl being mounted to the support member for pivotal movement between an engaged position, whereat it latchingly engages a corresponding pawl-receiving surface on the rotator arm of said first seat back mounting assembly to arrest movement of said rotator arm away from the design position thereof, and a disengaged position, whereat it is removed from contact with the pawl-receiving surface to permit movement of said rotator arm from its design position towards its fold-flat position.

According to yet another aspect, said selective, reversible forward pivotal movement of the seat back portion about the second pivot axis is under control of a pair of rotatable stop pawls, the rotatable stop pawls each being pivotally connected to a respective rotator arm for movement between an engaged position, whereat it engages a corresponding stop pawl-receiving surface on the seat back mounting bracket which is pivotally mounted to said each rotator arm, to arrest forward movement of said seat back mounting bracket away from its design position, and a disengaged position, whereat it is removed from contact with the stop pawl receiving surface to permit movement of said seat back mounting bracket towards a collapsed position thereof, defined by the collapsed position of the seat back portion.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, which are briefly described hereinbelow and wherein common reference numerals are used to denote like parts.

DETAILED DESCRIPTION OF THE PREFERRED EMBODIMENT

Figure 1:
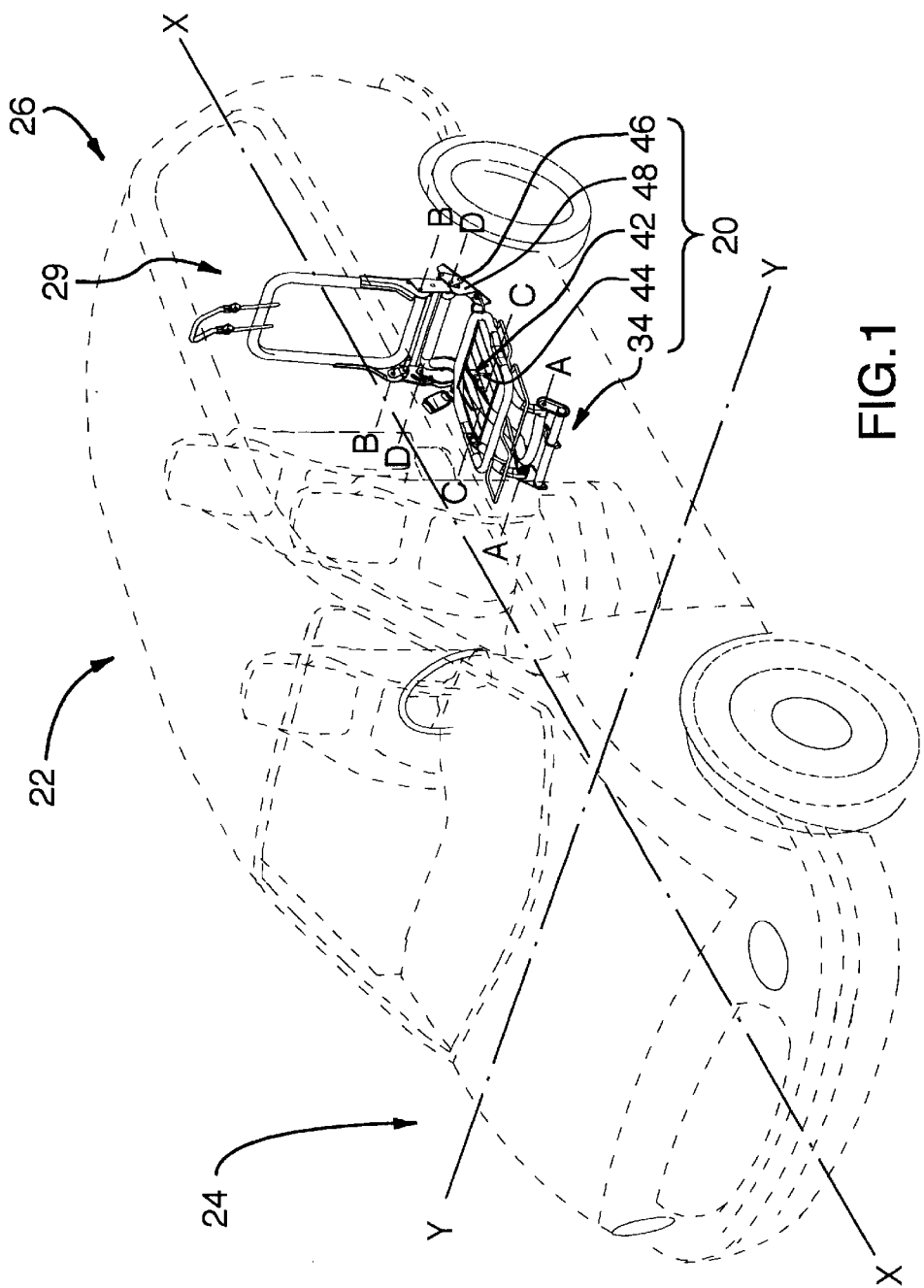
FIG. 1 is a front, top, left side perspective view of a seat assembly according to a preferred embodiment of the present invention in use in a vehicle, with the seat member of the seat assembly disposed at an occupiable design position. For clarity, the vehicle is shown in phantom outline, as are the other seat assemblies provided in the vehicle, and the upholstery of the subject seat assembly is omitted.

FIG. 1 illustrates a seat assembly 29 according to a preferred embodiment of the present invention in use with a vehicle 22 of the type which has a front end 24, a rear end 26, a longitudinal axis X—X extending between the front end 24 and the rear end 26 and a lateral axis Y—Y arranged substantially transverse to the longitudinal axis X—X.

Figure 2:
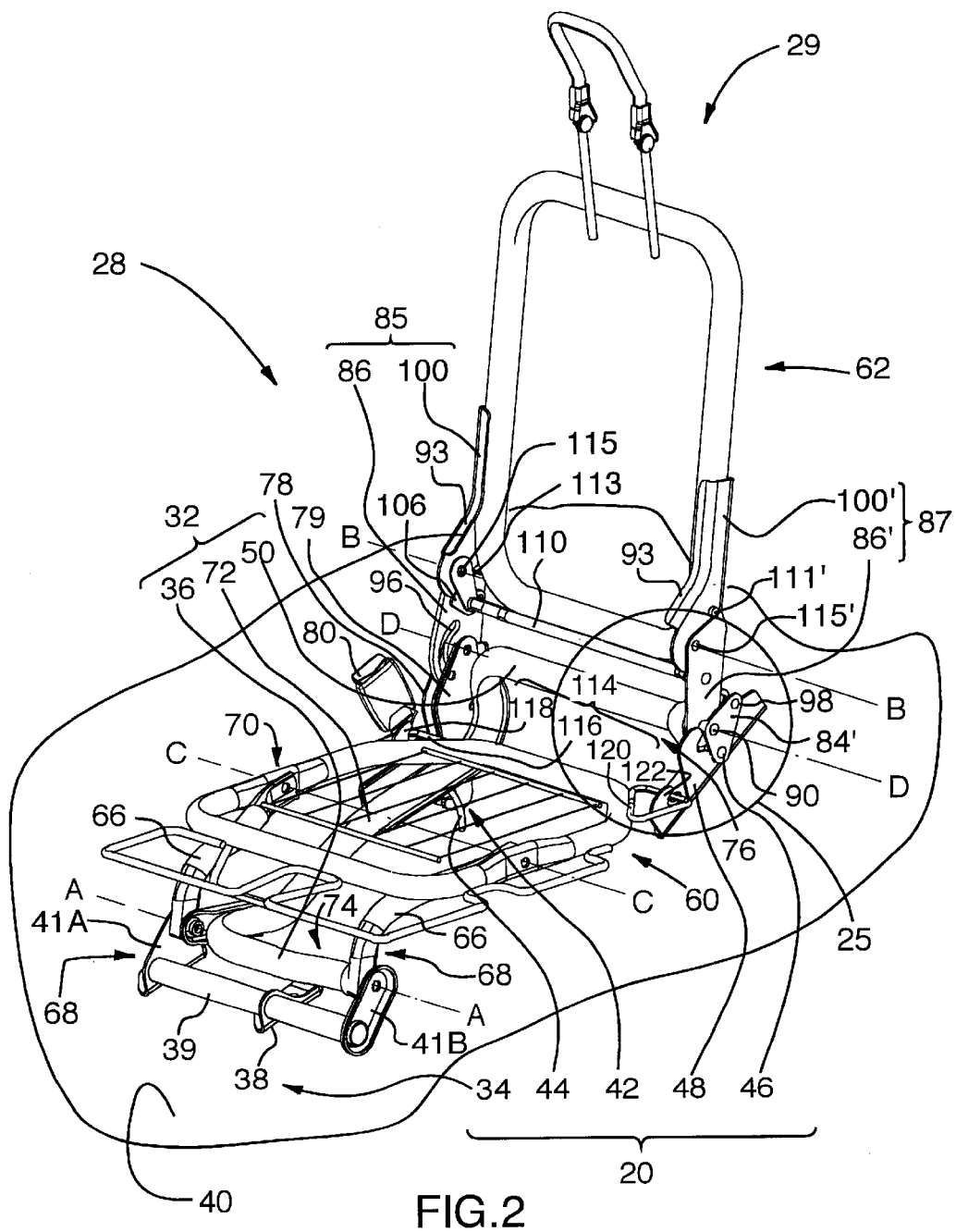
FIG. 2 is an enlarged view of the seat assembly of FIG. 1.

The seat assembly 29 comprises a seat member, designated with general reference numeral 28 in FIG. 2 and including a support member 32, the seat member 28 being in use with a preferred embodiment of the mounting system of the present invention designated with general reference numeral 20.

The mounting system 20 comprises a mounting means, designated with general reference numeral 34 in FIG. 2, for defining a lateral first pivot axis A—A proximate to vehicle 22 and for mounting a first portion 36 of the support member 32 on the vehicle 22 for pivotal movement of the seat member 28 about the first pivot axis A—A to a design position, as illustrated in FIG. 2, whereat the seat member 28 is occupiable. As illustrated, the preferred mounting means 34 will be seen to comprise a front clamping bracket 38 rigidly mounted to the floor surface 40 of the vehicle 22 in encircling relation about a cross tube 39, which cross tube 39 has a pair of opposed mounting brackets 41A, 41B mounted one-each at opposite ends thereof.

Additionally, as will be described hereinafter, the mounting system 20 comprises a latch member 42, a latch-engaging member 44, a striker pin 46 and a striker plate 48.

Figure 3:
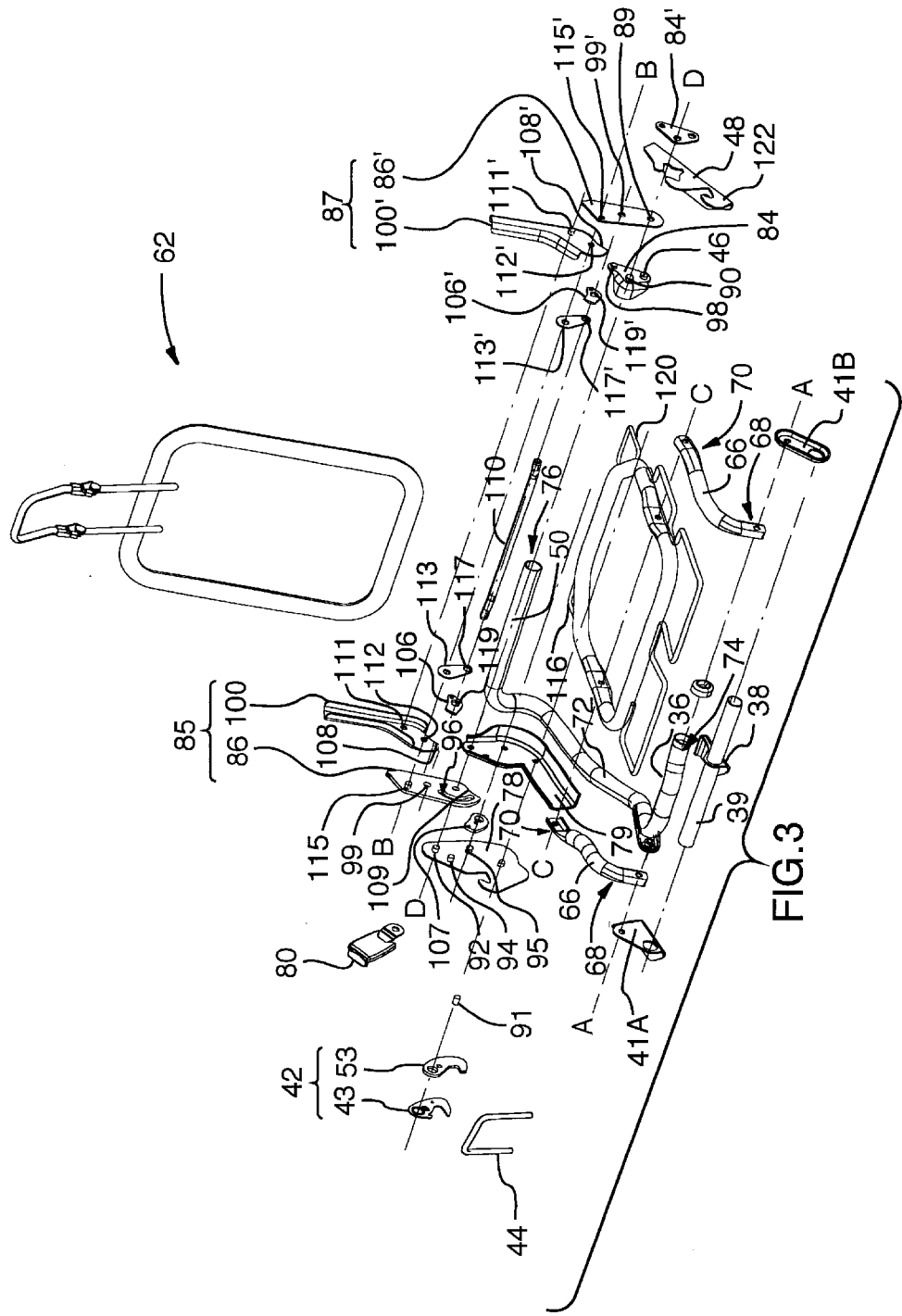
FIG. 3 is an exploded view similar to FIG. 2.
Figure 4:
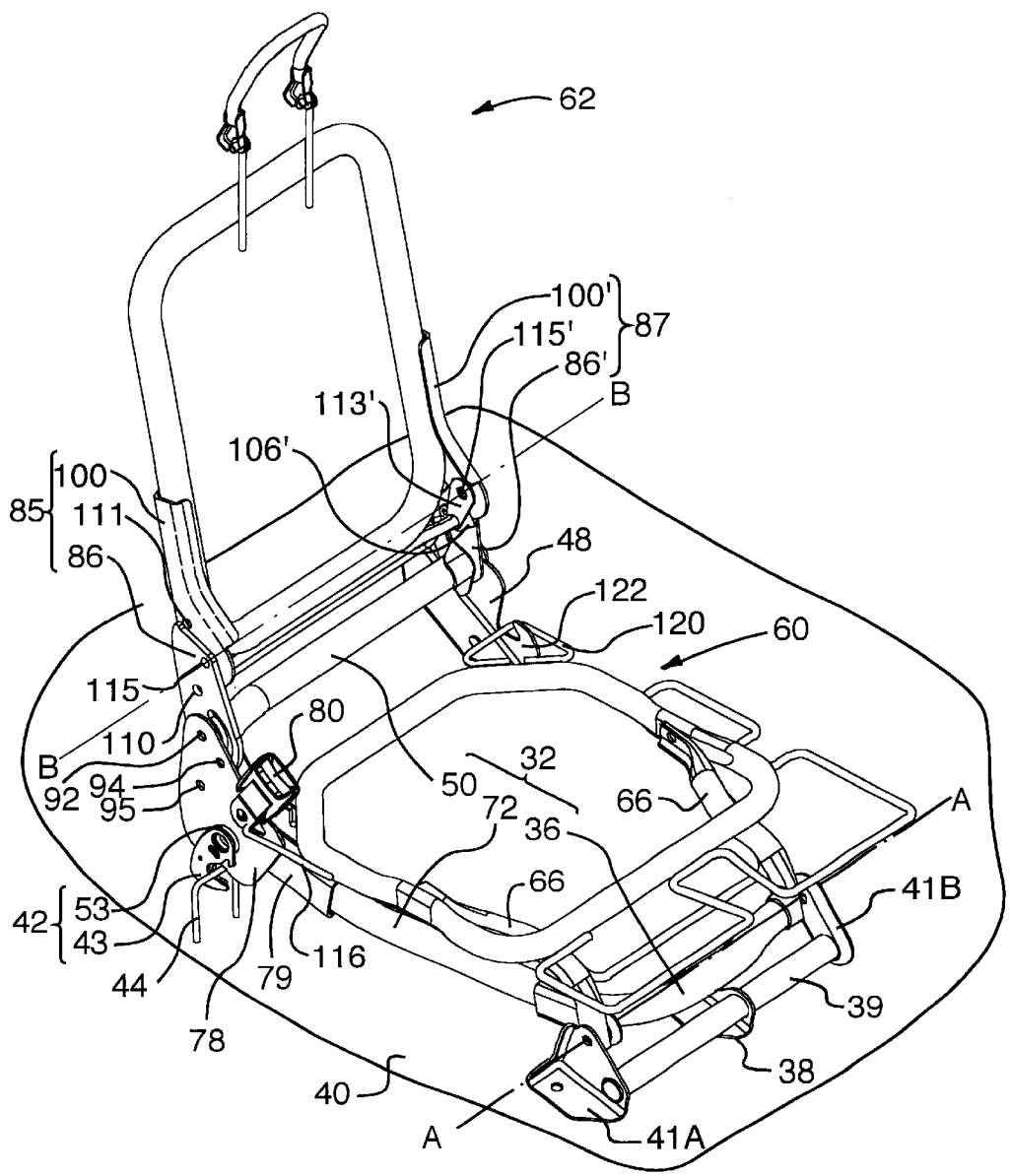
FIG. 4 is a front, top, right side perspective view of the structure of FIG. 2.
Figure 5:
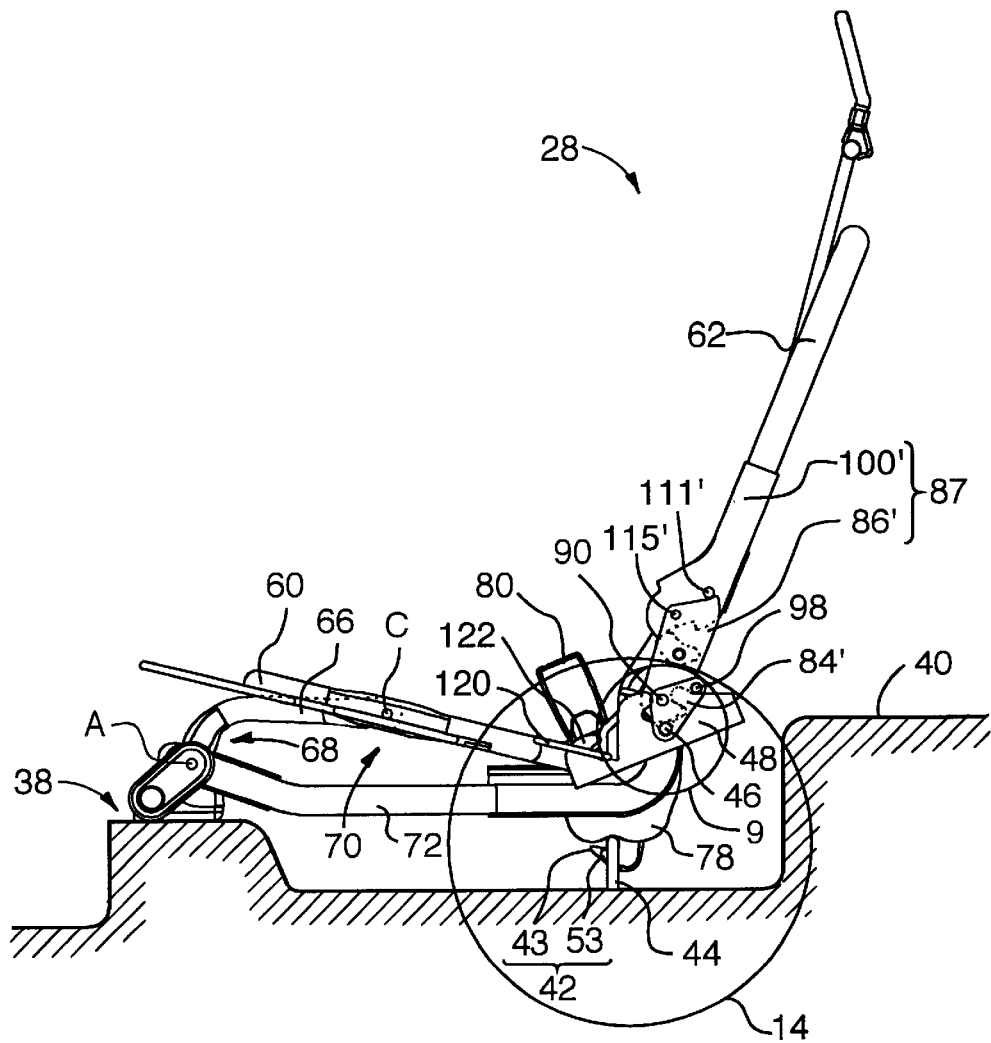
FIG. 5 is a left side elevational view of the structure of FIG. 2.
Figure 6:
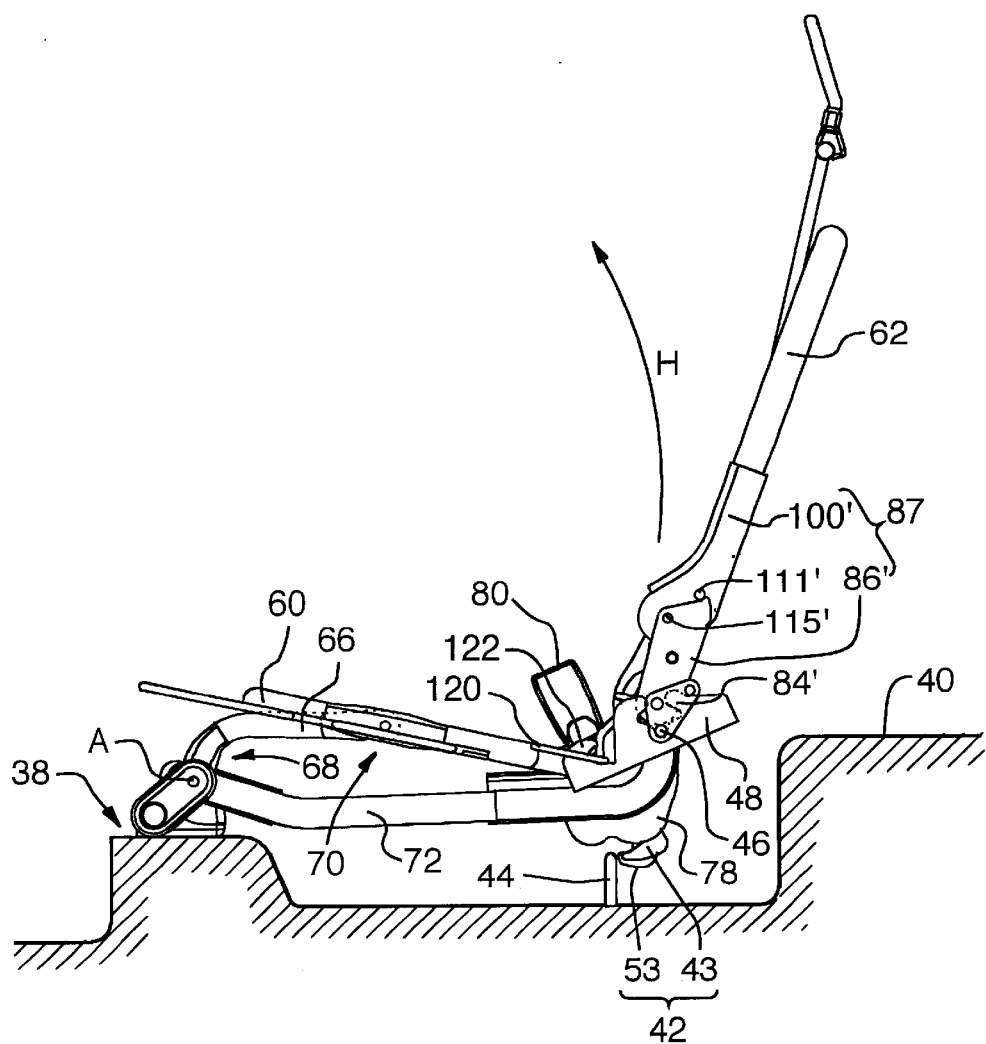
FIG. 6 is a view similar to FIG. 5, with the first latch hook of the mounting system of the seat assembly disposed at its disengaged position.

The latch member 42, as seen in FIGS. 3 and 4, comprises a first latch hook 43 operatively pivotally mounted, through the agency of a support plate 79 discussed more fully in following paragraphs, to a second portion 50 of the support member 32 for selective movement between an engaged position shown in FIGS. 4 and 5 and a disengaged position shown in FIG. 6.

To effect such movement of the first latch hook 43, conventional actuation means, such as a Bowden cable operatively attached to a pivotable release handle (neither shown) may be employed. As well, a spring (not shown)

may be employed to bias the first latch hook 43 towards its engaged position.

When the seat member 28 is at its design position, the latch-engaging member 44, namely, a lug member securely mounted on the vehicle floor 40, is adapted to be selectively, securely engaged by the first latch hook 43 upon movement of the first latch hook 43 to its engaged position.

The striker pin 46 is mounted on the second portion 50 of the support member 32 in laterally-spaced relation to the latch member 42, as best illustrated in FIG. 2.

Figure 7:
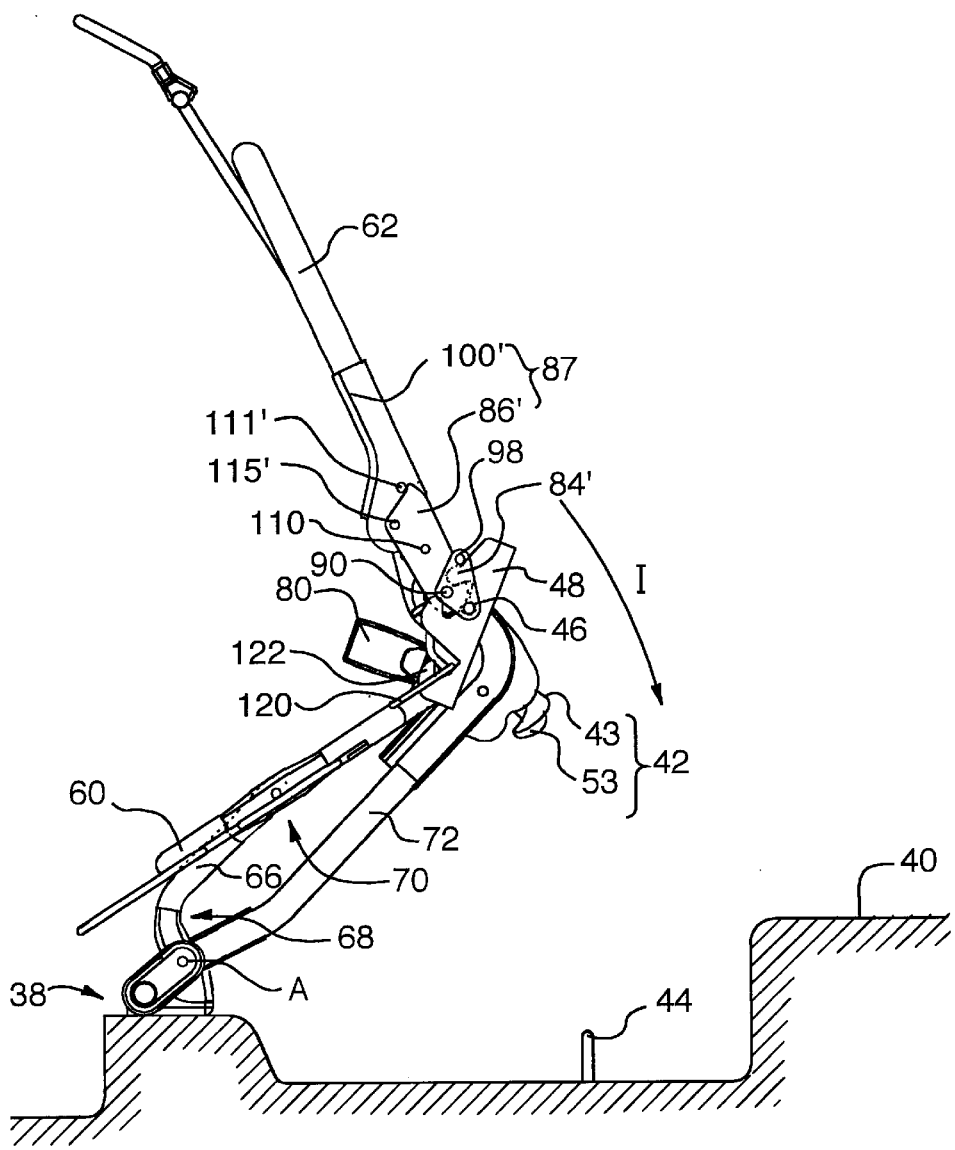
FIG. 7 is a view similar to FIG. 6, with the seat member tilted forwardly relative to its position in FIG. 6.
Figure 8:
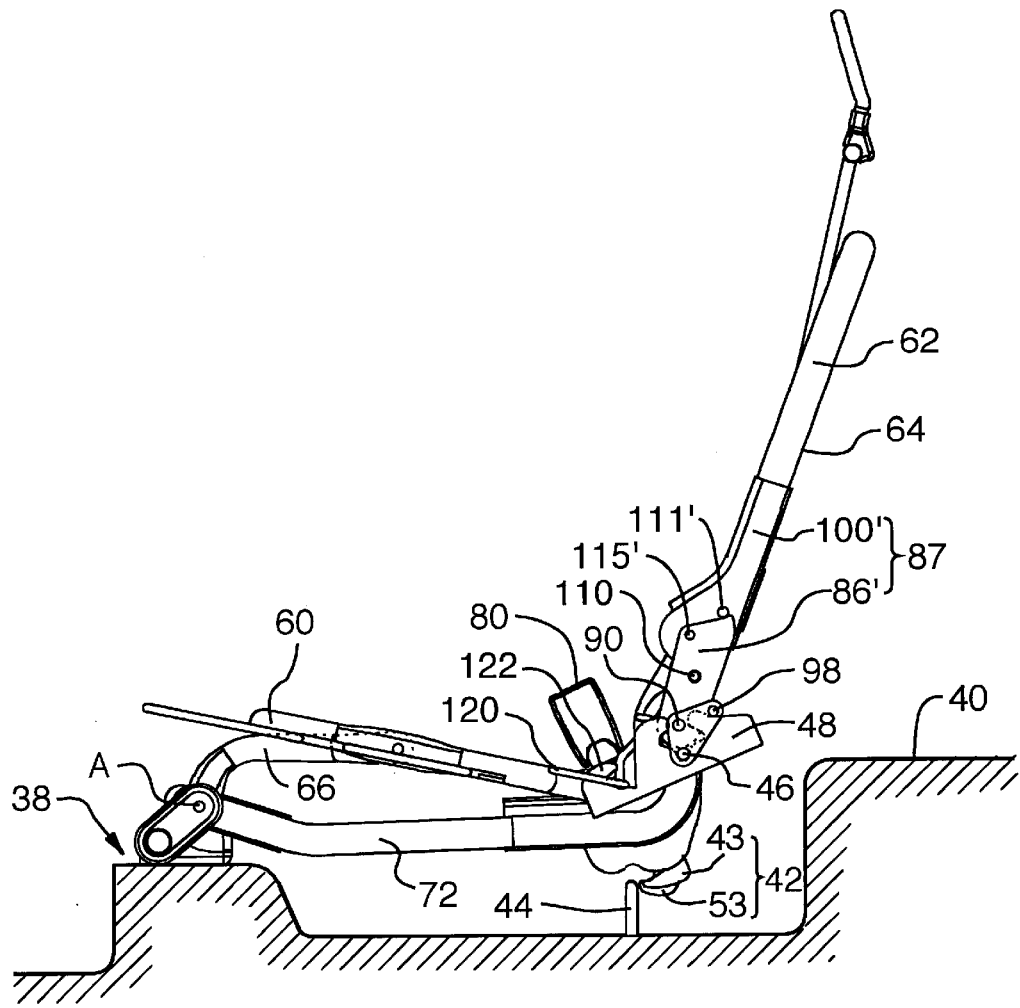
FIG. 8 is a view similar to FIG. 7, showing the seat member tilted rearwardly from its position in FIG. 7 and about to reach its design position.
Figure 20:
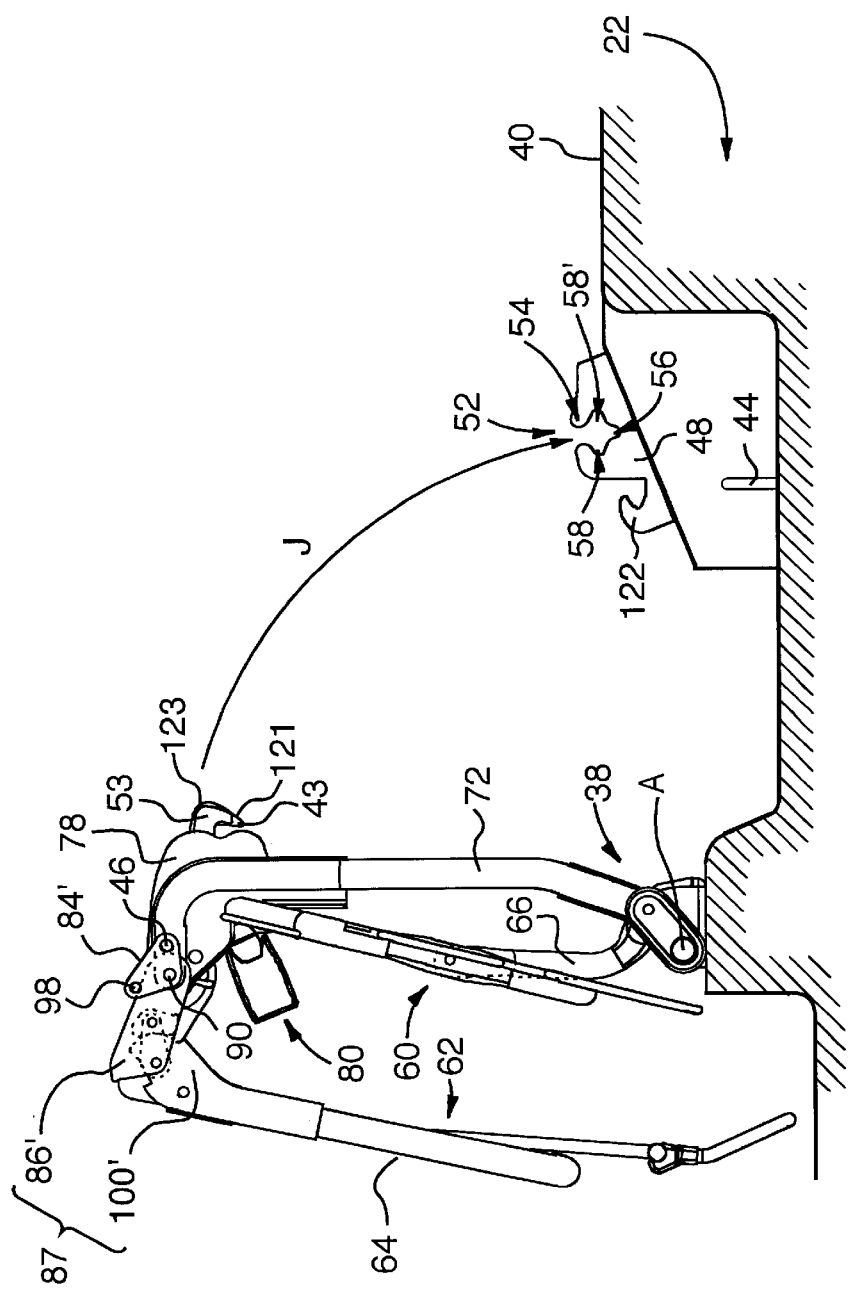
FIG. 20 is a view similar to FIG. 19, with the support member, the seat back portion and the seat cushion portion of the seat member pivoted forwardly to their respective upfolded positions.

The striker plate 48 is mounted on the floor 40 of the vehicle 22 and presents, as seen in FIG. 20, a generally arcuate slot 52 having an open end 54 and a closed end 56 and is mounted on said vehicle floor 40 at an operative position whereat the slot 52 extends in an arcuate manner about the first pivot axis A—A so as to permit the striker pin 46 to travel into the open end 54 and along said slot 52 to a striker pin design position defined by contact of the striker pin 46 with the closed end 56 of the slot 52 during said pivotal movement of the seat member 28 to its design position, as indicated by the sequence of movement in FIGS. 7, 8, 5. Movement of the striker pin 46 into and along slot 52 to its design position is indicated by the direction of arrow J in FIG. 20.

The striker plate 48 further presents a pair of sockets 58, 58' each being shaped and dimensioned to alternatively receive the striker pin 46 thereinto in close-fitting relation. The sockets 58, 58' are arranged in substantially opposed relation on opposite longitudinal sides of the slot 52 and are contiguous therewith, so as to permit, under either rear or frontal crash conditions of the vehicle 22, and by agency of deformation of the seat member 28 under such crash conditions, upward, longitudinal movement of the striker pin 46 thereinto to a rearward limit position or to a frontward limit position, respectively.

Figure 9:
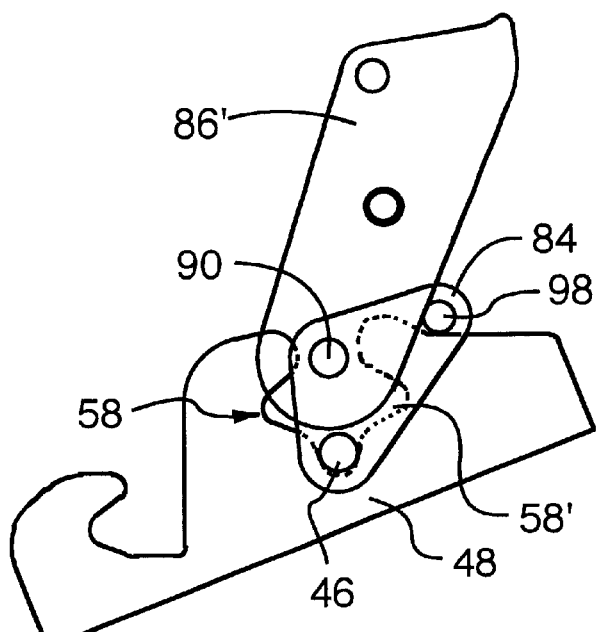
FIG. 9 is an enlarged view of the encircled area 9 identified in FIG. 5, showing the striker pin of the mounting system at its design position.
Figure 10:
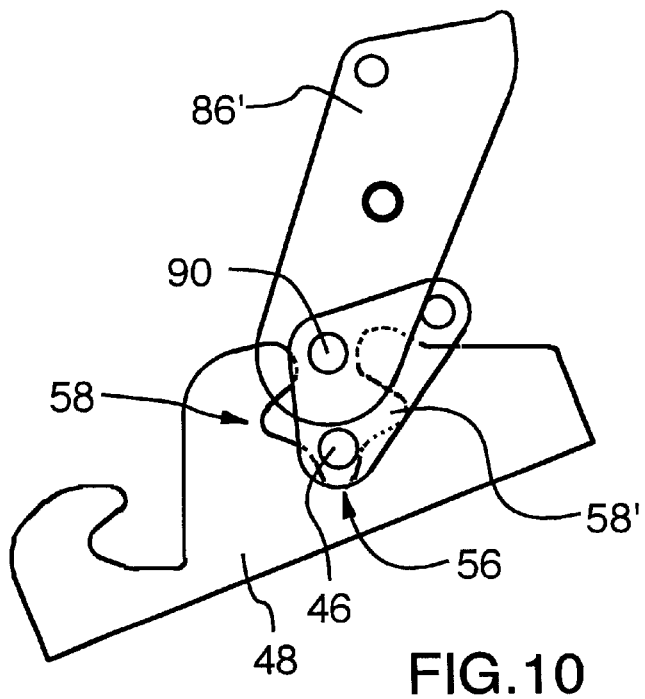
FIG. 10 is a view similar to FIG. 9, showing inter alia the striker pin upwardly and rearwardly disposed from its design position.
Figure 11:
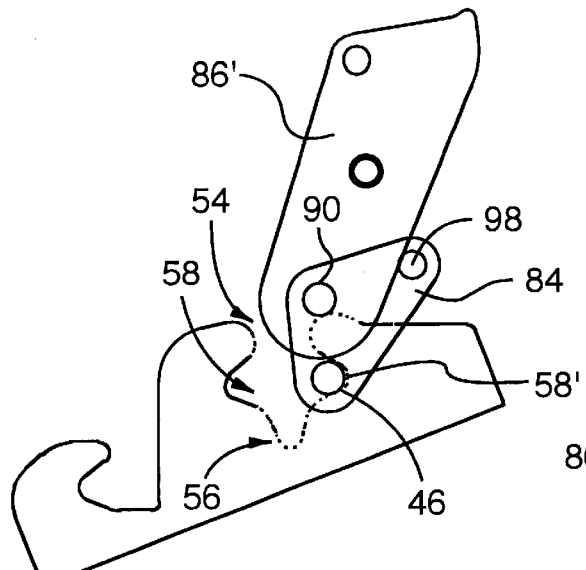
FIG. 11 is a view similar to FIG. 10, with the striker pin at its rearward limit position.
Figure 12:
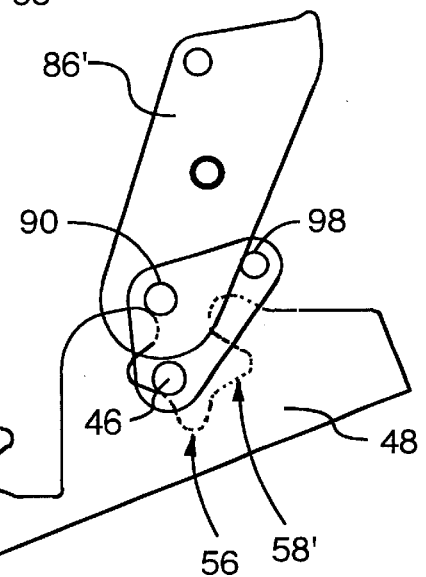
FIG. 12 is a view similar to FIG. 9, showing, inter alia the striker pin frontwardly and rearwardly disposed from its design position.
Figure 13:
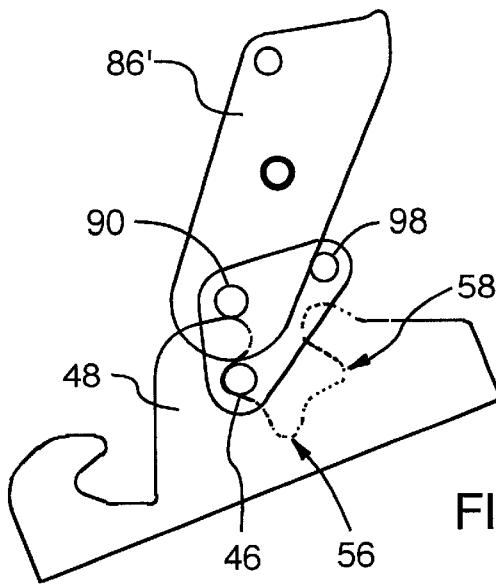
FIG. 13 is a view similar to FIG. 12, with the striker pin at its frontward limit position.

At the rearward limit position, vertical movement of the striker pin 46, as well as further rearward longitudinal movement, is arrested by contact of the striker pin 46 with the socket 58'; at the frontward limit position, vertical movement of the striker pin 46, as well as further frontward longitudinal movement, is arrested by contact of the striker pin 46 with the socket 58. Movement of the striker pin 46 to its rearward limit position is illustrated by the sequence of movement shown in FIGS. 9, 10, 11; movement of the striker pin 46 to its frontward limit position is illustrated by the sequence of movement shown in FIGS. 9, 12, 13.

It will be evident that the foregoing combination has, in and of itself, substantial usefulness, in that it provides a tumble-forward seat which exhibits, inter alia, latching characteristics similar to those exhibited by paired-latch seat assemblies in frontal crash conditions (when such characteristics are most desirable) so as to permit the seat member to be constructed in the relatively lightweight, economical manner which can be achieved in paired-latch seat assemblies, while at the same time incorporating single handle release functionality without the attendant cost, weight and reliability issues that can be associated with the slave systems that are typically utilized in paired-latch seat assemblies to achieve this functionality.

However, in the preferred embodiment, further features are additionally provided.

One such feature comprises a second latch hook 53, seen in FIG. 4, which second latch hook 53 is operatively pivotally mounted to the second portion 50 (again, through the agency of support plate 79, described in following paragraphs) for movement between an engageable position (as shown in FIG. 5) and a disengaged position (as shown in FIG. 6).

Figure 14:
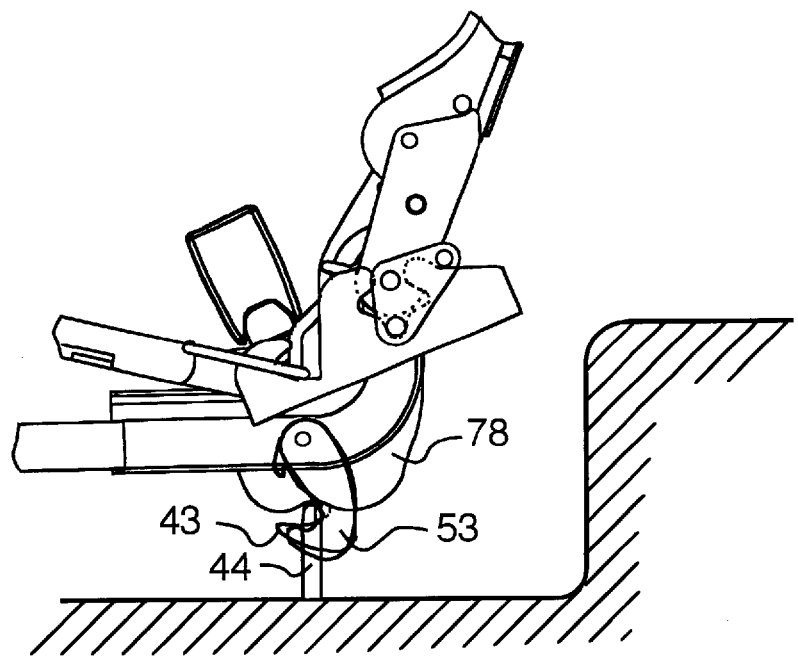
FIG. 14 is an enlarged view of the encircled area 14 identified in FIG. 5.
Figure 14A:
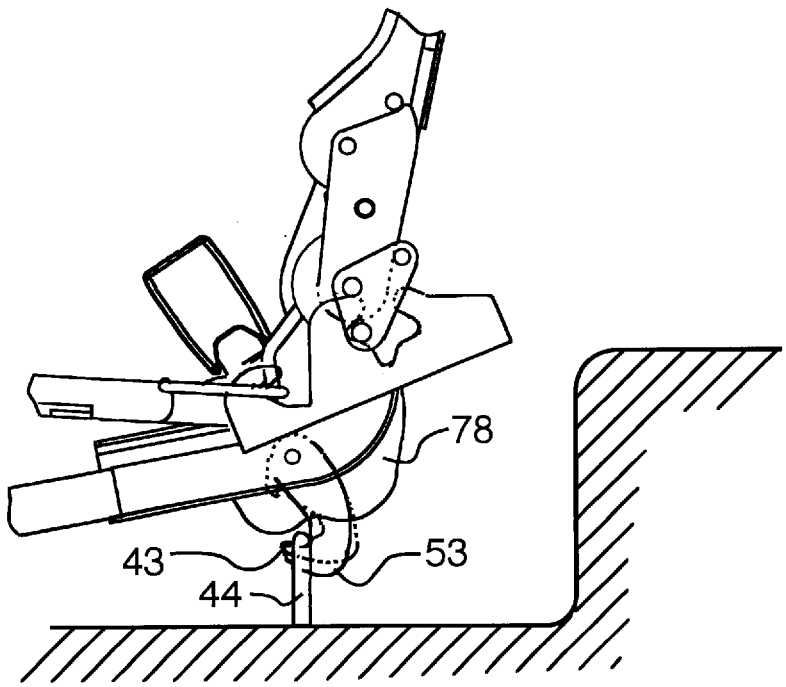
FIG. 14A is a view similar to FIG. 14, with the seat member shown in a deformed configuration.
Figure 26:
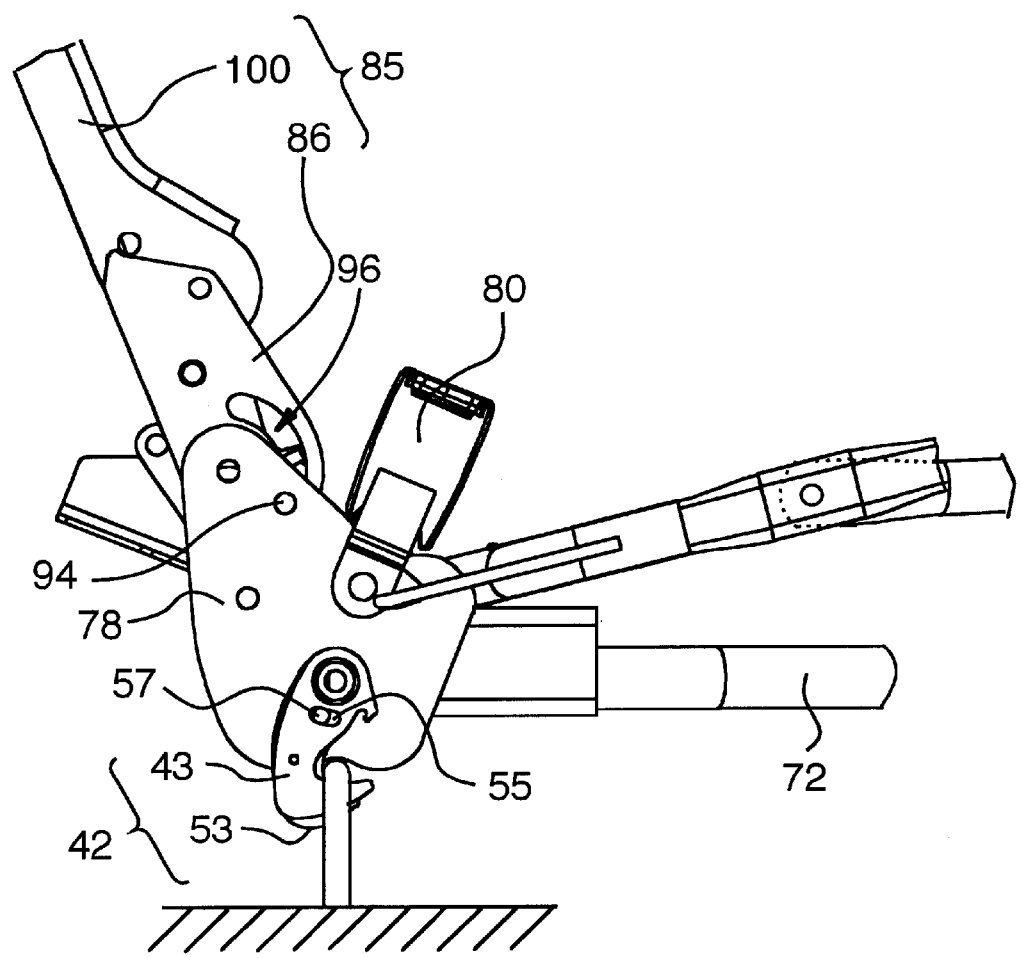
FIG. 26 is an enlarged view of the encircled area 26 identified in FIG. 15.

As best seen in FIG. 26, an elongate guide slot 55 is formed through the first latch hook 43 and a pin member 57 rigidly affixed to the second latch hook 53 extends from the second latch hook 53 through the guide slot 55 so as to engage said guide slot 55 in lost motion sliding relation, thereby to effect movement of the second latch hook 53 between its engageable position and its disengaged position upon movement of the first latch hook 43 between its engaged position and its disengaged position. With this arrangement, under frontal crash conditions of the vehicle 22, load forces on the seat member 28 may be sufficiently large to urge same frontwardly into a deformed configuration, as illustrated in FIG. 14A, so as to cause the first latch hook 43 to move from its engaged position partially towards its disengaged position, whereupon the second latch hook 53, which remains in its engageable position, securely engages the lug member 44. This arrangement is advantageous, in that it permits a general division of function, with the first latch hook 43 assuming the function of removing unpleasant "chuck" in the seat assembly 29 (i.e. by providing a substantially rattle-free connection between the seat member 28 and the vehicle 22 under routine everyday use conditions), with the second latch hook 53 ensuring that the connection is sufficiently robust to withstand the extreme loads experienced during front end collisions. In turn, this division of function is amenable to relatively inexpensive construction; since the first latch hook 43 will be exposed only to relatively modest loads, it can be constructed out of relatively light gauge material, which is amenable to precision fabrication (i.e. relatively close tolerances) at relatively low cost, so as to produce a relatively rattle-free finished product; as the second latch hook 53 needs to withstand high loads, it must be constructed out of relatively heavy gauge material, but since it is only engaged during crash conditions, can be inexpensively fashioned with fairly low tolerancing, all without deleterious impact upon vehicle occupant safety.

This arrangement is also advantageous in that it provides for increased movement of the seat assembly 29 during, inter alia, frontal crash conditions, thereby permitting fairly deep sockets 58, 58' to be utilized and thereby enhancing the strength of the connection between the striker pin 46 and the striker plate 48 at the frontward limit position; absent this arrangement in the preferred embodiment illustrated, in order to provide similar movement of the striker pin 46 during frontal crash conditions, it would be necessary to construct the seat member in a less rigid manner (not shown), which, inter alia, could impact upon consumer acceptance.

According to a further desired but optional feature of the present invention, the seat member 28 includes a seat cushion portion 60 and a seat back portion 62, with each of the support member 32, the seat cushion portion 60 and the seat back portion 62 having respective design positions defined by the design position of the seat member 28, as illustrated representatively in FIG. 2.

As a further desired feature, the seat member 28 defines a second pivot axis B—B which, when the seat cushion portion 60 is disposed at its design position, is aligned substantially laterally and is disposed adjacent the rear end of the seat cushion portion 60.

Figure 15:
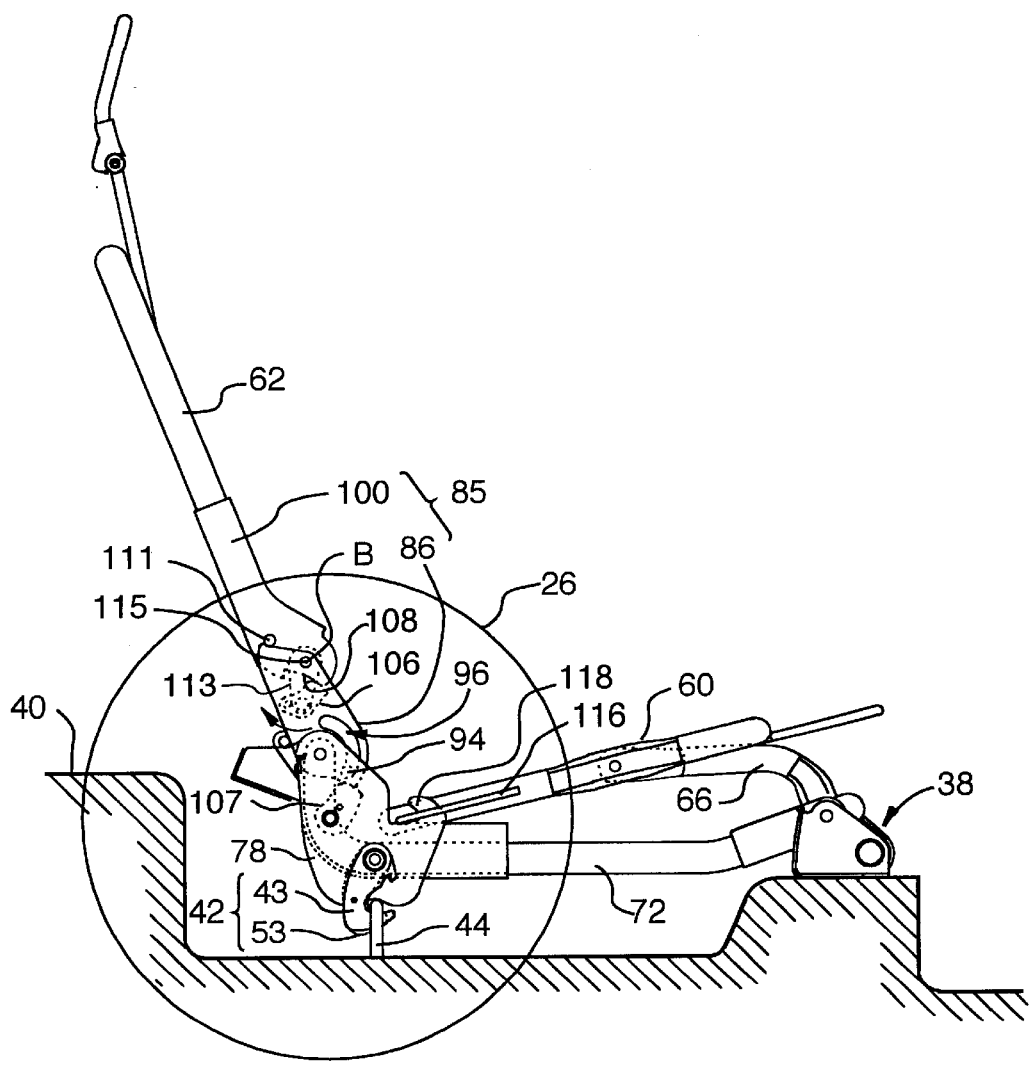
FIG. 15 is a right side elevational view of the structure of FIG. 5, wherein the seat member is disposed at its design position, the first latch hook is disposed at its engaged position and the rotatable stop pawls of the seat member are each disposed at their engaged positions.
Figure 16:
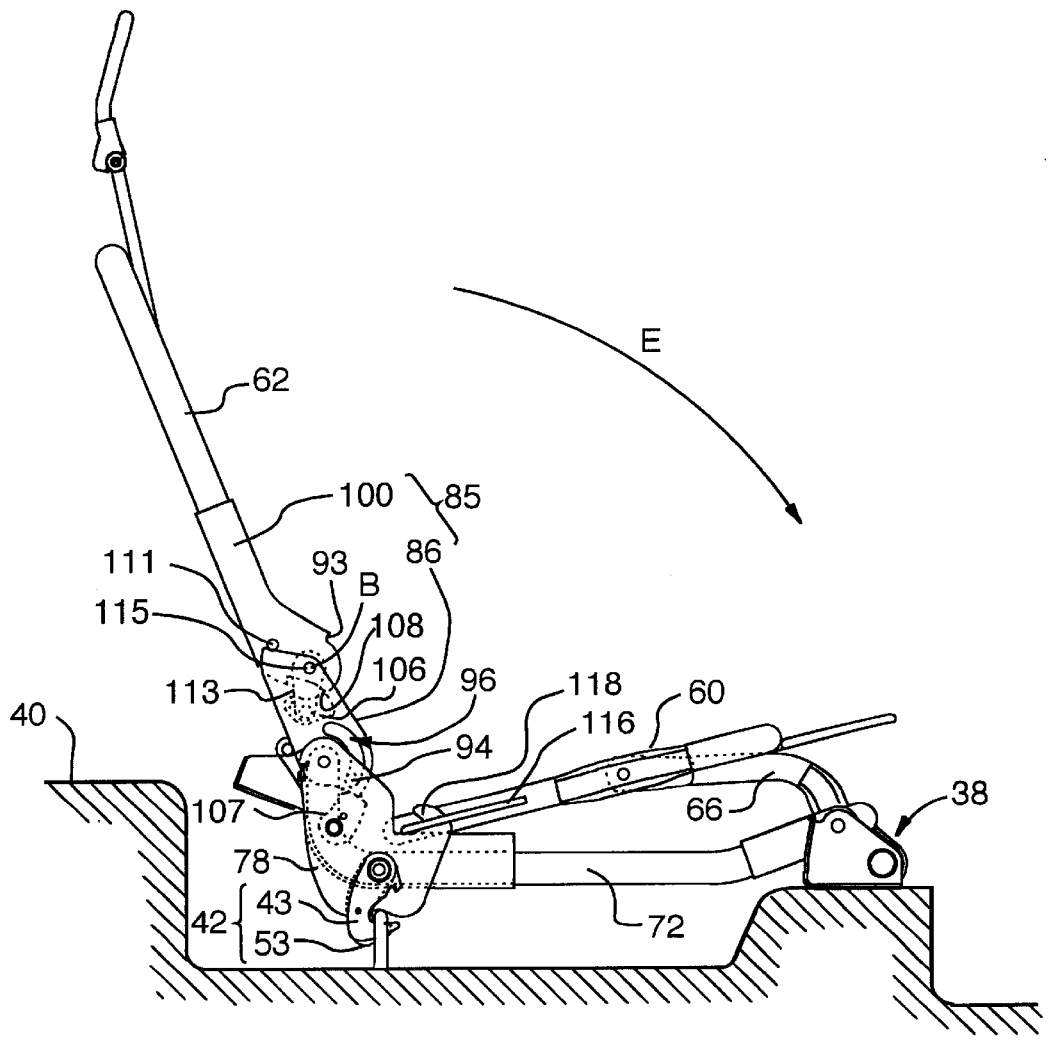
FIG. 16 is a view similar to FIG. 15, with the rotatable stop pawls each disposed at their disengaged positions.
Figure 17:
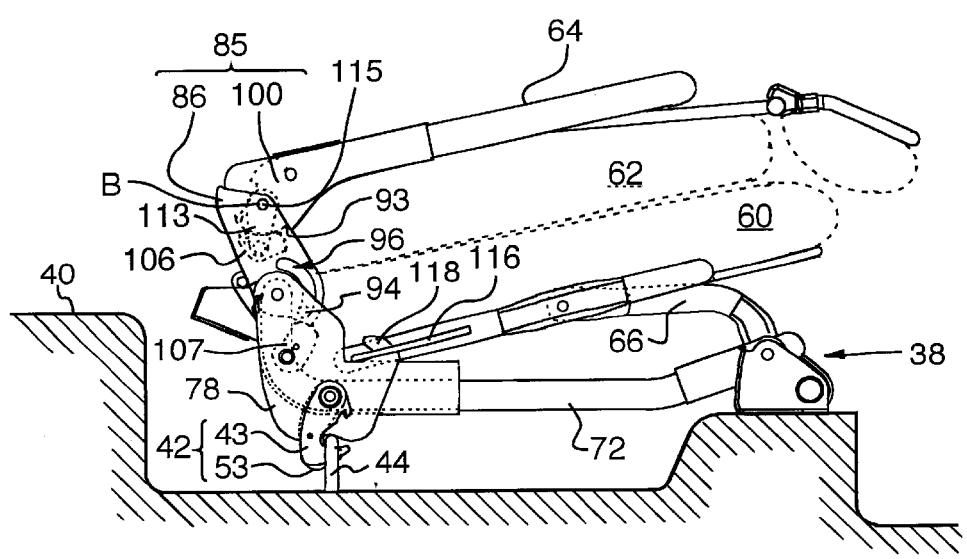
FIG. 17 is a view similar to FIG. 16, with the seat back portion of the seat member disposed at its collapsed position, resting upon the seat cushion portion, the upholstery of the seat back portion and the seat cushion portion being illustrated in phantom outline.

As a further desired feature, the seat member 28 is adapted to provide for selective, reversible forward pivotal movement of the seat back portion 62 (as indicated by arrow E in FIG. 16), relative to the seat cushion portion 60, about the second pivot axis B—B, from its design position, illustrated in FIG. 15, to a collapsed position, as illustrated in FIG. 17.

At its collapsed position, the seat back portion 62 rests upon the seat cushion portion 60, when the seat cushion portion 60 is disposed at its design position, as illustrated in FIG. 17, wherein the upholstery of the seat back portion 62 and the seat cushion portion 60, illustrated in phantom outline, is seen to be in contact.

Further, in the collapsed position shown in FIG. 17, it will be evident that the rear surface 64 of the seat back portion 62 is orientated substantially horizontally, to receive, for example, a load, foods or beverages to be consumed by an occupant in a neighbouring seat, or a laptop computer, to be operated by such an occupant (not shown).

Figure 19:
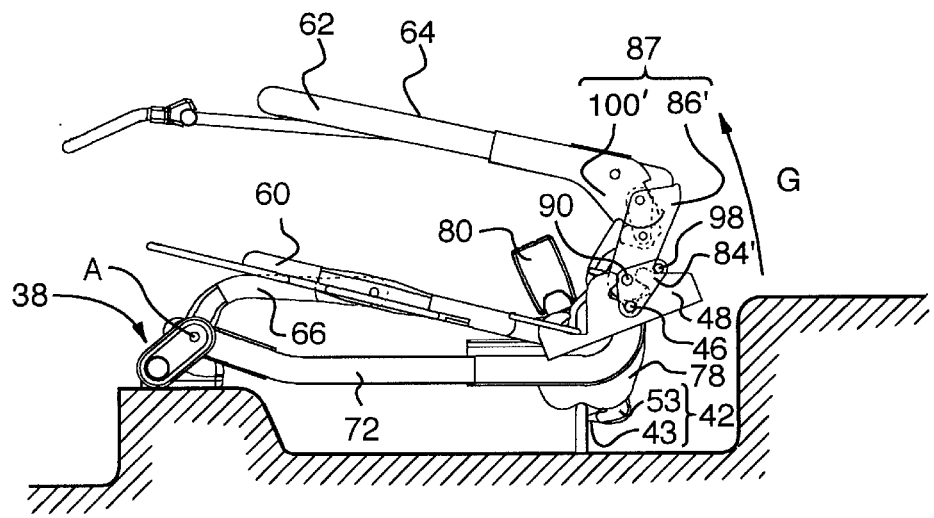
FIG. 19 is a view similar to FIG. 18, with the first latch hook disposed at its disengaged position.

The seat assembly 29 is further adapted to provide, when the seat back portion 62 is disposed at its collapsed position, for contemporaneous, selective, reversible forward pivotal movement of support member 32, seat back portion 62 and seat cushion portion 60 about the first pivot axis A—A, as indicated by arrow G in FIG. 19, to respective upfolded positions whereat, inter alia, the seat cushion portion 60 is orientated substantially vertically and the seat back portion 62 is disposed substantially frontwardly from the seat cushion portion 60, as is illustrated in FIG. 20.

Thus, the seat member of the preferred embodiment is of the fold and tumble class, as exemplified by the structure in aforementioned U.S. Pat. No. 6,220,665.

However, in contrast to this noted prior art structure, wherein the seat cushion and frame are constructed in a substantially integral manner, the support member 32 of the seat assembly 29 is distinct from the seat cushion portion 60 and the seat back portion 62 thereof.

Accordingly, to provide for said contemporaneous, selective, reversible forward pivotal movement of the support member 32, the seat back portion 62 and the seat cushion portion 60 about the first pivot axis A—A, the support member 32 has the seat cushion portion 60 and the seat back portion 62 operatively connected thereto (the seat back portion 62 actually being pivotally connected to the second portion 50 of the support member 32, to provide for said selective, reversible forward pivotal movement of the seat back portion 62 about the second pivot axis B—B.)

Figure 21:
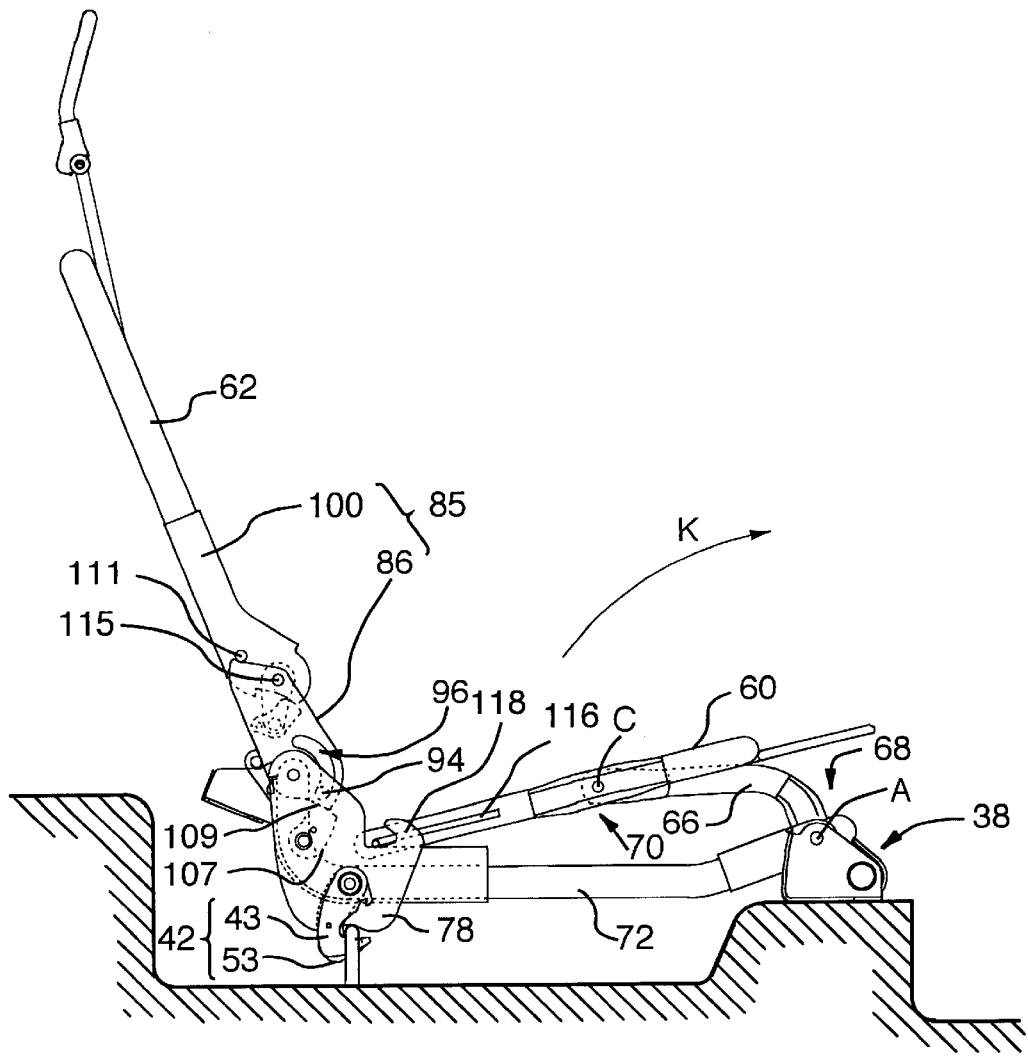
FIG. 21 is a view similar to FIG. 15, wherein the seat member is at its design position.
Figure 22:
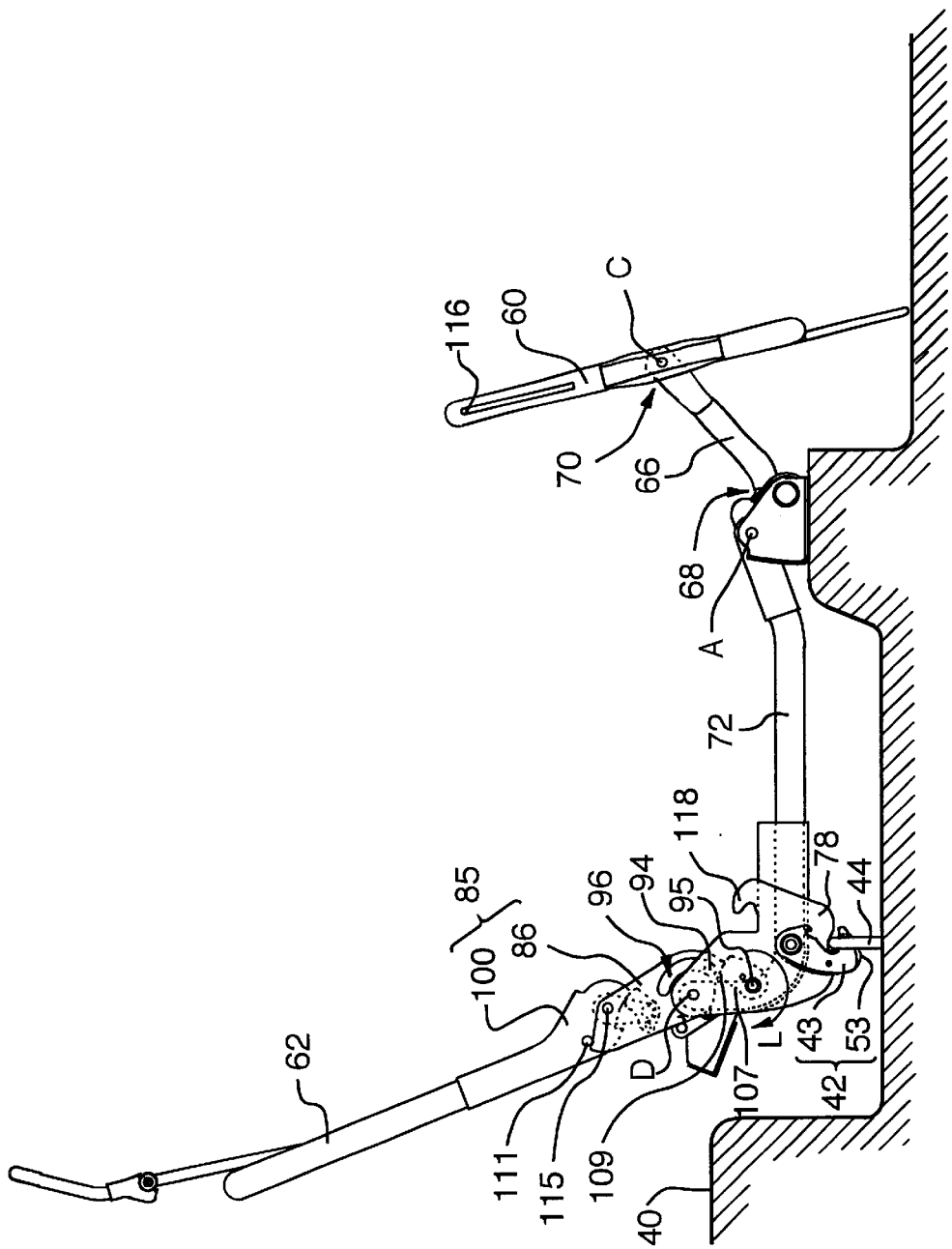
FIG. 22 is a view similar to FIG. 21, with the seat cushion portion, only, at its storage position.

A further feature of the preferred embodiment is facilitated by the aforementioned distinction between the seat cushion portion 60 and the support member 32. Specifically, the seat cushion portion 60 is detachably connected to the support member 32 and is adapted for movement, independent of the seat back portion 62 and the support member 32, between its design position (illustrated in FIG. 21) and a storage position (illustrated in FIG. 22), which storage position is relatively frontwardly disposed from the design position of the seat cushion portion 60, and whereat the seat cushion portion 60 is orientated substantially vertically. To provide for said movement of the seat cushion portion 60 between its design position and its storage position, the preferred seat member 28 comprises a pair of support tubes 66, each support tube 66 having a first end 68 mounted on the vehicle 22 (preferably through the agency of the mounting means 34 shown) for pivotal movement about the first pivot axis A—A, and a second end 70 mounted to the seat cushion portion 60 for pivotal movement thereof about a third pivot axis C—C substantially parallel to the first pivot axis A—A, as best illustrated in FIGS. 2, 21 and 22.

The aforementioned functionality of the seat cushion portion 60, namely, its mobility independent of the seat back portion 62 and the support member 32, may advantageously be employed for inter alia the storage of articles, such as jacking equipment (not shown), beneath the seat cushion portion 60, but in the preferred embodiment, further functionality is provided, which takes more complete advantage of the independent mobility of the seat cushion portion 60.

Figure 23:
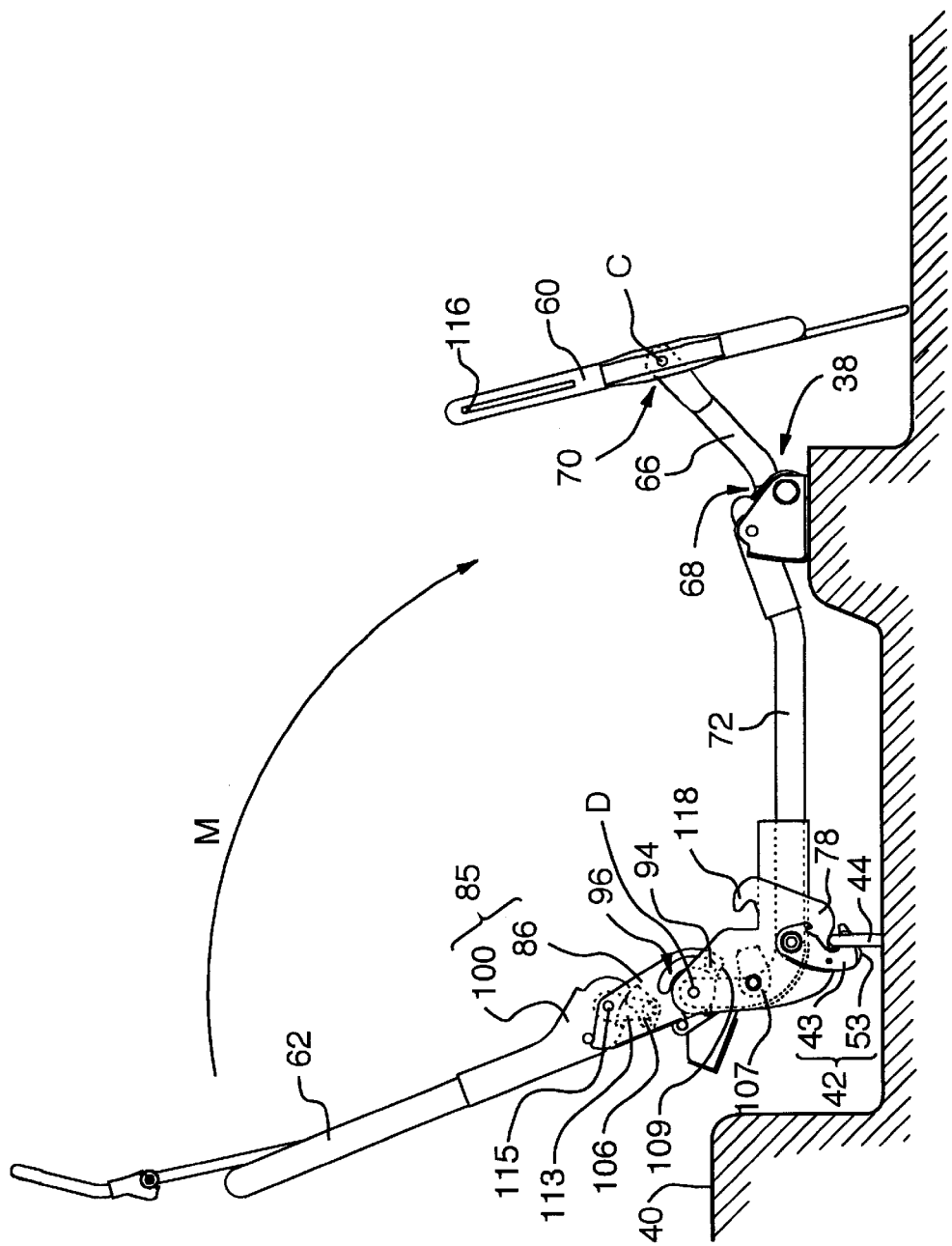
FIG. 23 is a view similar to FIG. 22, with the latch pawl of the seat member at its disengaged position.
Figure 24:
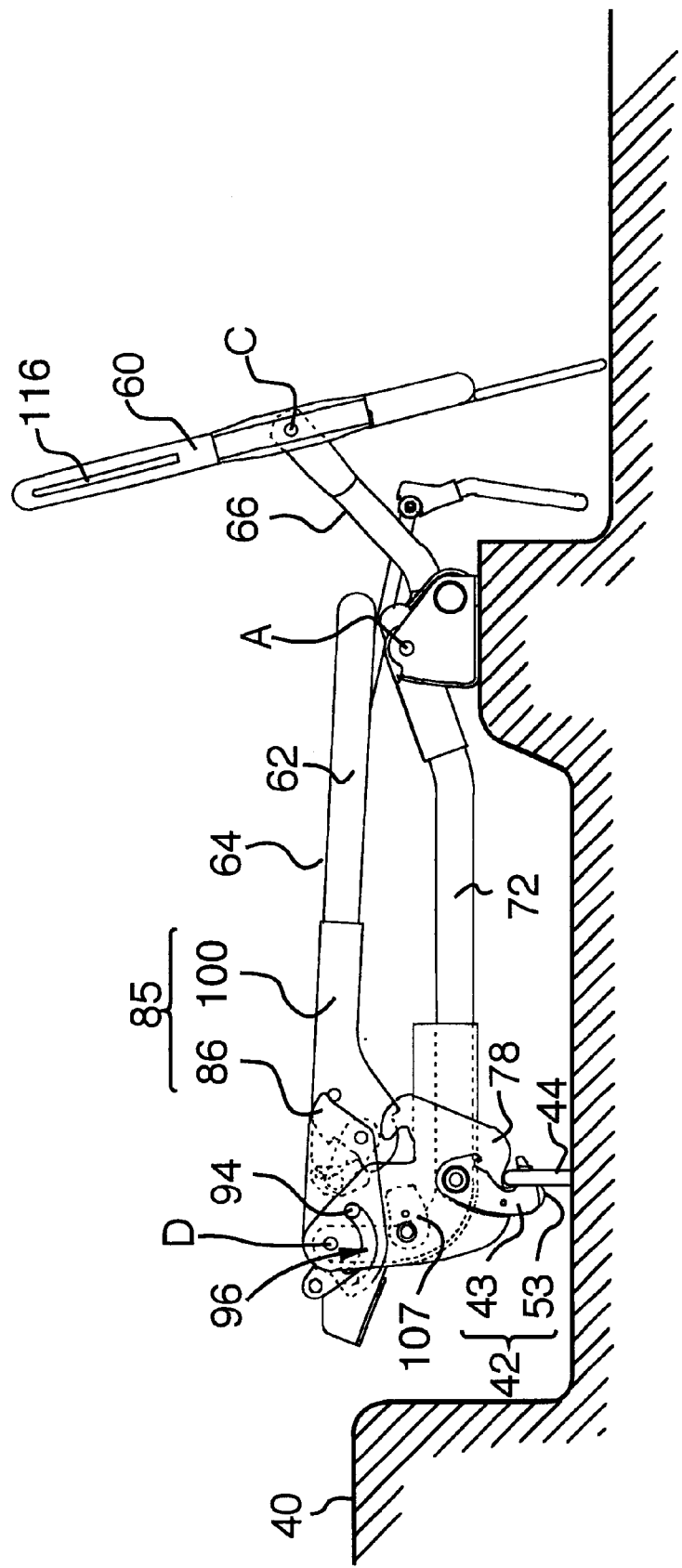
FIG. 24 is a view similar to FIG. 23, with the seat back portion at its fold-flat position.

More specifically, the seat member 28 is adapted, when the seat cushion portion 60 is at its storage position, to provide for selective, reversible forward folding movement of the seat back portion 62 in the direction of arrow M of FIG. 23 about a lateral fourth pivot axis D—D, disposed adjacent the second portion 50 of the support member 32, from its design position (as shown in FIG. 23) to a fold-flat position whereat the seat back portion 62 is nested rearwardly relative to the seat cushion portion 60, and disposed in a substantially horizontal orientation, as shown in FIG. 24. In the fold-flat position shown in FIG. 24, it will be evident that the rear surface 64 of the seat back portion 62 is substantially aligned with the vehicle floor 40 to receive, for example, relatively large loads (not shown).

Thus, the seat member 28 of the preferred embodiment also has "flip and tip" functionality, similar to that embodied in the second row seat assemblies found, for example, in the sport-utility vehicles sold in the United States in the 1995 model year by Chrysler Corporation under the trade-mark JEEP CHEROKEE (not shown).

For greater clarity in ascertaining the manner in which the preferred seat assembly 29 achieves the various functionalities aforediscussed, various main structural elements of the same will hereinafter be described with greater particularity.

In this regard, the preferred support member 32 will be seen, inter alia, in FIGS. 2 and 3 to be tubular, having an intermediate portion 72 interconnecting the first portion 36 and the second portion 50. The tubular support member 32 is generally C-shaped, with the intermediate portion 72 extending substantially between the first pivot axis A—A and the fourth pivot axis D—D, and the first portion 36 and the second portion 50 rigidly extending, in the same direction, from the intermediate portion 72 and in substantial alignment, respectively, with the first pivot axis A—A and the fourth pivot axis D—D, to respective terminii, 74, 76.

Also provided is the aforementioned support plate 79, as well as a bracing plate 78, best seen in FIGS. 3 and 4. The support plate 79 is rigidly connected, as by welding or the like, to the support member 32 adjacent to the junction of the second portion 50 and the intermediate portion 72 thereof, and has the bracing plate 78 rigidly connected thereto, in spaced relation, by pivot pin 92 and limit pin 94 which rigidly extend therebetween and are discussed more fully in following paragraphs. The latch member 42, which comprises the first latch hook 43 and the second latch hook 53, is pivotally mounted to the bracing plate 78 by means of latch-mounting pin 91 connected to the bracing plate 78, by staking or the like, and about which latch-mounting pin 91 the first latch hook 43 and the second latch hook 53 are journaled, as best indicated in FIG. 3. The bracing plate 78 also has attached thereto a conventional female seat belt end 80.

Figure 25:
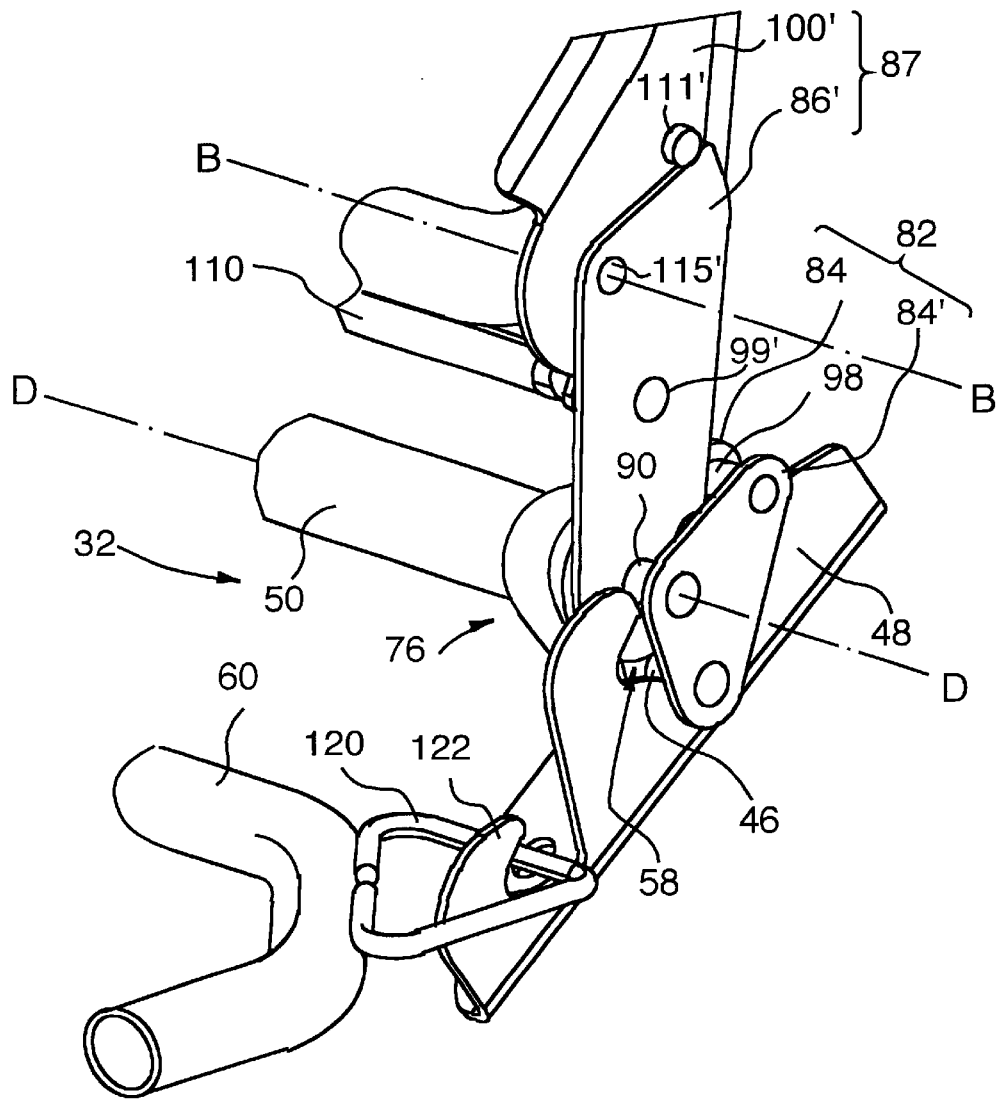
FIG. 25 is an enlarged view of the encircled area 25 identified in FIG. 2.

A secondary bracket member 82 is also provided. As best seen in FIG. 25, the secondary bracket member 82 preferably comprises a pair of spaced-apart containment plates 84, 84' disposed on opposite sides of the striker pin 46 and rigidly connected thereto, by staking or the like, with the inner one 84 of said containment plates 84, 84' being rigidly mounted to the second portion 50 of the support member 32 adjacent its terminus 76.

To provide for said selective pivotal movement about the fourth pivot axis D—D, the seat member 28 further comprises a pair of seat back mounting assemblies 85, 87, comprising a first seat back mounting assembly 85 and a second seat back mounting assembly 87. As illustrated in FIG. 2, each seat back mounting assembly 85, 87 includes a distal portion 100, 100' securely attached to the seat back portion 62 and a proximal portion 86, 86' mounted, in a manner discussed more fully in following paragraphs, to the support member 32 for controlled pivotal movement about the fourth pivot axis D—D.

To provide for said selective, reversible forward pivotal movement of the seat back portion 62 about the second pivot axis B—B, the proximal portion 86, 86' of each seat back mounting assembly 85, 87 is constructed as a rotator arm and the distal portion 100, 100' as a seat back mounting bracket, with the rotator arm 86, 86' and the seat back mounting bracket 100, 100' of each seat back mounting assembly 85, 87 being mounted to one another for selective, relative pivotal movement about the second pivot axis B—B. Such mounting is effected by means of mounting pins 115, 115' which rigidly extend from the rotator arms 86, 86' through corresponding holes 112, 112' formed in the seat back mounting brackets 100, 100', as best illustrated in FIGS. 2, 3 and 4.

The first seat back mounting assembly 85 is interposed between bracing plate 78 and support plate 79 and is pivotally mounted to the support member 32 by being journaled for rotation about aforementioned pivot pin 92 which is in alignment with the fourth pivot axis D—D, as illustrated in FIGS. 3 and 4. Pivot pin 92 is staked, or the like, to each of the bracing plate 78 and the support plate 79.

As illustrated in FIG. 3, a guide slot 96, which extends in an arcuate manner about the fourth pivot axis D—D, is formed through the rotator arm 86 of the first seat back mounting assembly 85, and the aforementioned limit pin 94, which is rigidly connected to each of the bracing plate 78 and the support plate 79, by staking or the like, extends through said guide slot 96, so as to circumscribe movement of said rotator arm 86 between a fold-flat position thereof, shown in FIG. 24 and defined by the fold-flat position of the seat back portion 62, and a design position thereof, shown in FIG. 23, and defined by the design position of the seat back portion 62.

In order to control said selective, reversible forward folding movement of the seat back portion 62 about the fourth pivot axis D—D, a latch pawl 107 is also provided. The latch pawl 107 is pivotally mounted to the bracing plate 78, and thereby mounted to support member 32 for pivotal movement between an engaged position, shown in FIG. 22, whereat it latchingly securingly engages a corresponding pawl-receiving surface 109 on the rotator arm 86 of said first seat back mounting bracket 85, to arrest movement of said rotator arm 86 away from its design position, and a disengaged position, shown in FIG. 23, whereat it is removed from contact with the pawl-receiving surface 109 to permit movement of rotator arm 86 from its design position in the direction of arrow M towards its fold-flat position, which position is shown in FIG. 24. Such pivotal mounting of the latch pawl 107 is provided by a pawl mounting pin 95 which is staked at its ends to the bracing plate 78 and to the support plate 79 and about which the latch pawl 107 is journalled.

As best indicated in FIG. 25, the second seat back mounting assembly 87 is pivotally mounted to support member 32 adjacent to the terminus 76 of the second portion 50 thereof by means of a pivot shaft 90 which rigidly extends between the containment plates 84, 84' in alignment with the fourth pivot axis D—D. More specifically, the rotator arm 86' of the second seat back mounting assembly 87 is interposed between the containment plates 84, 84' and is provided with a mounting hole 89, best seen in FIG. 3, to receive said pivot shaft 90, thereby to journal the rotator arm 86' for rotation about said pivot shaft 90.

In order to avoid exposing the seat member 28 to unnecessary torsional forces in, inter alia, rearward crash conditions, a stop pin 98 is provided in the preferred embodiment. The stop pin 98, which rigidly extends between the containment plates 84, 84' and is connected thereto, by staking or the like, is positioned so as to arrest rearward pivotal movement of the rotator arm 86' of the second seat back mounting assembly 87 beyond the design position thereof, as indicated in FIG. 25, wherein the rotator arm 86' and the stop pin 98 are in contact.

To control the aforementioned selective, reversible forward pivotal movement of the seat back portion 62 about the second pivot axis B—B, a pair of rotatable stop pawls 106, 106' is provided, as is a pair of rearward limit pins 111, 111' and a pair of suspension brackets 113, 113'.

As best seen in FIGS. 2 and 4, the rearward limit pins 111, 111' each project from a respective seat back mounting bracket 100, 100' and are arranged to impinge upon the top edge of the rotator arm 86, 86' to which said respective seat back mounting bracket 100, 100' is pivotally mounted, thereby to arrest rearward pivotal movement of said respective seat back mounting bracket 100, 100' beyond its design position.

Each suspension bracket 113, 113' is rigidly attached to a respective mounting pin 115, 115', by staking or the like, and has a respective rotatable stop pawl 106, 106' connected thereto for pivotal movement between an engaged position, illustrated in FIG. 15, whereat it engages a corresponding stop pawl-receiving surface 108, 108' on the seat back mounting bracket 100, 100' which is journaled about said respective mounting pin 115, 115' thereby to arrest forward movement of said seat back mounting bracket 100, 100' away from its design position, and a disengaged position, illustrated in FIG. 16, whereat said respective stop pawl 106, 106' is removed from contact with the corresponding stop pawl receiving surface 108, 108' thereby to permit movement of the seat back mounting bracket 100, 100' about the second pivot axis B—B towards its collapsed position.

A protruding lip 93, illustrated in FIGS. 2 and 17, is provided on each seat back mounting bracket 100, 100' to prevent over-rotation, through engagement with the rotatable stop pawls 106, 106'.

With reference to FIGS. 2–4, the pair of rotatable stop pawls 106, 106' are rigidly connected to one another by means of a tie rod 110 for simultaneous actuation, which can be effected, for example, by manipulation of a hand operable release handle rigidly connected to a respective one thereof (not shown). As illustrated, the tie rod 110 is mounted for rotation within bores 117, 117' provided in the suspension brackets 113, 113' as well as in bores 99, 99' provided in rotator arms 86, 86'. The rotatable stop pawls 106, 106' are also provided with bores 119, 119' through which the tie rod 110 extends, but are rigidly connected to the tie rod 110, by a key or the like (not shown) such that rotation of the tie rod 110 imparts rotation to the rotatable stop pawls 106, 106' for said simultaneous latching and unlatching actuation thereof, as explained above.

Also provided is a latching means, designated with general reference numeral 114 in FIG. 2, for arresting longitudinal movement of the seat cushion portion 60 relative to the seat back portion 62 when the seat cushion portion 60 and the support member 32 are in their design positions. The preferred latching means 114 comprises a first co-operating portion 116, namely, a rigid wire loop, mounted on seat cushion portion 60 adjacent its inboard rear corner, and a second co-operating portion 118, namely, a hook, mounted on the support member 32 in adjacent relation thereto, the first co-operating portion 116 and the second co-operating portion 118 being adapted to engage one-another in longitudinally-arresting relation when the seat cushion portion 60 is in its design position. The preferred latching means 114 also comprises a third co-operating portion 120, namely, a triangular rigid wire loop, mounted on the seat cushion portion 60 adjacent its outboard rear corner, and a fourth co-operating portion 122, namely, a hook, adjacently mounted, in use, on the vehicle 22, the third co-operating portion 120 and the fourth co-operating portion 122 being adapted to engage one-another in longitudinally-arresting relation when the seat cushion portion 60 is in its design position.

In the preferred embodiment illustrated, the fourth co-operating portion 122 and the striker plate 48 are integrally formed, as are the second co-operating portion 118 and the bracing plate 78.

In operation, the seat member 28 will initially be typically disposed in the design position thereof illustrated, inter alia, in FIG. 5, which position is occupiable.

In order to move the support member 32, the seat cushion portion 60 and the seat back portion 62 to their respective upfolded positions illustrated in FIG. 20, the seat back portion 62 must first be moved to its collapsed position, as shown in FIG. 17. To do so, the user need only manipulate the rotatable stop pawls 106, 106' from their engaged positions to their respective disengaged positions, as shown in FIG. 16, by manipulation of tie rod 110 via a handle or other actuation mechanism as may be provided, whereupon the stop pawls 106, 106' are removed from contact with the stop pawl receiving surfaces 108, 108' so as to permit seat back portion 62 to be manually manipulated from its design position to its forwardly folded, collapsed position, as indicated by the direction of arrow E in FIG. 16.

Figure 18:
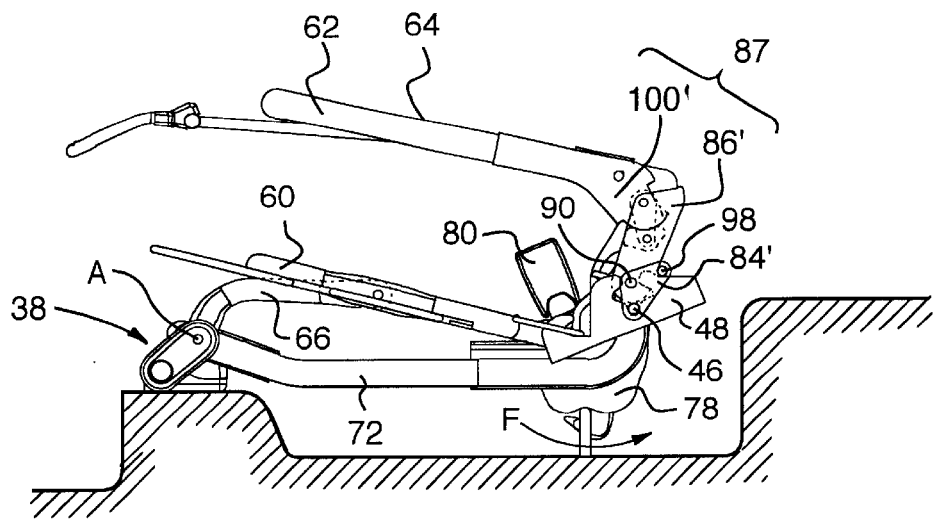
FIG. 18 is a left side elevational view of the structure of FIG. 17.

With the seat back portion 62 in the collapsed position of FIG. 17, the user may then move the first latch hook 43 to its disengaged position, as indicated by arrow F in FIG. 18, through manipulation of a suitable control handle (not shown) operatively connected in a known manner to first latch hook 43 by means of a Bowden cable or the like. This action results in contemporaneous movement of the second latch hook 53 to its disengaged position, by agency of the guide slot 55 and the pin member 57, whereupon the second portion 50 of the support member 32 is released from latched engagement with the vehicle floor 40, so as to permit rotation of the support member 32 about the first pivot axis A—A, and the seat back portion 62 pivotally mounted thereto, as indicated by arrow G in FIG. 19.

During said movement of the support member 32, the seat cushion portion 60 is supported for rotation by the support member 32, specifically, by engagement of the second co-operating portion 118 and the first co-operating portion 116, such that rotation of the support member 32 to its upfolded position causes concurrent rotation of the seat back portion 62 and the seat cushion portion 60 to their respective upfolded positions, as shown in FIG. 20.

Releasable connection means, or biasing devices (not shown), may be disposed within the vehicle 22 to assist in moving the support member 32, the seat back portion 62 and the seat cushion portion 60 to their respective upfolded positions, and retaining the same thereat, thereby to avoid unintended return to the design position.

When it is desired to return the seat member 28 to the design position, the support member 32 and the seat cushion portion 60 may be manually manipulated to their respective design positions, and the seat back portion 62 may be manually manipulated to its collapsed position, as indicated by the direction of arrow J in FIG. 20. During such manipulation, camming surfaces 121, 123 provided on the first latch hook 43 and the second latch hook 53 are brought into contact against the lug member 44. This contact urges the latch hooks 43, 53 to their respective disengaged positions against the force of biasing means (not shown), which are provided to return latch hooks 43, 53 to their respective engaged and engageable positions after the support member 32 has reached its design position, thereby to securely fasten the support member 32 to the vehicle floor 40.

Thereafter, the seat back portion 62 may be manually manipulated towards its design position, whereupon the rotatable stop pawls 106, 106' can be returned, by suitable bias means (not shown) to their engaged positions, thereby locking the seat member 28 in the design position.

From the design position of the seat member 28 shown in FIG. 21, the seat back portion 62 may be moved to the fold-flat position thereof shown in FIG. 24 after the preliminary step of moving the seat cushion portion 60 to its storage position shown in FIG. 22. This is effected by a user simply tipping the seat cushion portion 60 upwardly and frontwardly, as indicated by arrow K in FIG. 21, so as to permit rigid wire loops 116, 120 to clear hooks 118, 122.

Thereafter, the user may manipulate the latch pawl 107 to its disengaged position illustrated in FIG. 23 by a handle and Bowden cable arrangement, or the like (not shown) so as to release the seat back portion 62 for pivotal movement about axis D—D. The direction of manipulation of the latch pawl 107 is indicated by arrow L in FIG. 22. Once so unlocked, the seat back portion 62 can be manually manipulated to its fold-flat position illustrated in FIG. 24, as indicated by arrow M in FIG. 23.

When it is desired to return the seat member 28 to the design position, the user manipulates the seat back portion 62 back to its design position shown in FIG. 23. Following such manipulation, the latch pawl 107 can be returned to its engaged position, by suitable bias means (not shown), thereby to lock the seat back portion 62 in place, as shown in FIG. 22, and the seat cushion portion 60 may thereafter be manually manipulated to its design position, as shown in FIG. 21.

Various modifications and alterations may be used in the design and manufacture of the mounting system according to the present invention without departing from the spirit and scope of the invention.

For example, whereas the illustrations show the mounting system in use with a seat member, it should be understood that the scope of the invention is not limited to the mounting system in use, but extends, inter alia, to the mounting system itself.

Further, whereas in the preferred embodiment illustrated, deformation of the seat member is effected through flexure of the seat member, it should be understood that the necessary deformation of the object, or the seat member, as the case may be, could equally be derived through a mechanical linkage provided therein, in combination with suitable biasing means to maintain the object is an non-deformed configuration except under crash conditions. In this regard, is should be understood that "crash" conditions include any instance of extreme loading on the seat member irrespective of whether such loading is caused by external forces or by rapid deceleration or acceleration of the vehicle and whether or not such rapid deceleration or acceleration is a result of a vehicular collision.

Yet further, whereas the design position of the striker pin of the preferred embodiment is defined by the closed end of the slot, so as to support the seat member at its design position, it will be evident that this also need not be the case. Indeed, it will be noted that the slot need not be open-ended and could be constructed of sufficient length to permit pivotal movement of the object through any desired range of motion. Similarly, the slot need not be closed-ended, and could be formed of two parts, spaced-apart from one another.

As well, whereas the invention is described with reference to mounting means which provide for "pivotal" mounting, it will be understood that mounting means which provide for non-circular mounting, such as eccentric, or even linear mounting may be employed with equal utility, by suitably adjusting the shape of the slot into which the striker pin travels.

Additionally, whereas in the preferred embodiment, the mounting system constitutes a component in a seat assembly, it will be evident that the mounting system has usefulness in other applications. Among other things, it is, for example, contemplated that the mounting system could be usefully employed to mount tailgates to pickup trucks.

Further, whereas the illustrations shown the seat assembly in use in an automobile, it will be understood that the seat assembly can be utilized with equal utility, inter alia, with any vehicle having a longitudinal axis, and it will also be understood that the vehicle does not form part of the invention.

As well, whereas the preferred seat assembly illustrated and described herein is intended for deployment on the left side of a vehicle, it will be readily understood by persons of ordinary skill in the art that the seat assembly could be constructed in a mirror image (not shown) for deployment on the rights side of a vehicle.

Additionally, whereas in the preferred embodiment illustrated, movement of the striker pin to the rearward limit position and the frontward limit position involves an aspect of vertical movement, this is not believed to be necessary, but is only preferred by virtue of the loads typically encountered in the preferred seat assembly illustrated.

Yet further, whereas a number of the structural elements of the invention are described herein as "plates", it will be appreciated that such structures need not be uniformly flat to practise the invention.

Accordingly, it should be understood that the scope of the invention is limited only by the accompanying claims, purposively construed.

We claim:

1. A mounting system for use with a vehicle and an object to be mounted on the vehicle, the object having a first portion and a second portion and the vehicle having a front end, a rear end, a longitudinal axis extending between the front end and the rear end and a lateral axis arranged substantially transverse to the longitudinal axis, the mounting system comprising:

mounting means for defining a lateral first pivot axis proximate to the vehicle and for mounting the first portion of the object on the vehicle for pivotal movement of the object about the first pivot axis to a design position;

a latch member which, in use, is mounted on the second portion of the object;

a latch-engaging member which, in use, is mounted on said vehicle and is adapted to selectively, securely engage with the latch member when the object at its design position;

a striker pin which, in use, is mounted on the second portion of the object in laterally-spaced relation to the latch member; and a striker plate presenting a slot having an open end and a closed end and further presenting a socket arranged to one side of the slot and contiguous therewith, the striker plate being mounted, in use, on said vehicle at an operative position whereat the socket is disposed frontwardly relative to the slot and whereat the striker pin travels into the open end of the slot and along said slot to a design position, adjacent the closed end of the slot and longitudinally rearwardly adjacent to the socket, during said pivotal movement of the object to its design position, the socket being shaped and dimensioned so as to permit, in use, under frontal crash conditions of the vehicle and by agency of deformation of said object, frontward longitudinal movement of the striker pin thereinto to a frontward limit position whereat the striker plate contacts the striker pin to arrest further frontward longitudinal movement of the striker pin.

2. A mounting system for use with a vehicle and an object to be mounted on the vehicle, the object having a first portion and a second portion and the vehicle having a front end, a rear end, a longitudinal axis extending between the front end and the rear end and a lateral axis arranged substantially transverse to the longitudinal axis, the mounting system comprising:

mounting means for defining a lateral first pivot axis proximate to the vehicle and for mounting the first portion of the object on the vehicle for pivotal movement of the object about the first pivot axis to a design position;

a latch member which, in use, is mounted on the second portion of the object;

a latch-engaging member which, in use, is mounted on said vehicle and is adapted to selectively, securely engage with the latch member when the object is at its design position;

a striker pin which, in use, is mounted on the second portion of the object in laterally-spaced relation to the latch member; and a striker plate presenting a slot having an open end and a closed end and further presenting a pair of sockets arranged in substantially opposed relation on opposite sides of the slot and contiguous therewith, the striker plate being mounted, in use, on said vehicle at an operative position whereat the sockets are disposed on opposite longitudinal sides of the slot and whereat the striker pin travels into the open end of the slot and along said slot to a design position, adjacent the closed end of the slot and between the sockets, during said pivotal movement of the object to its design position, the sockets each being shaped and dimensioned so as to permit, in use, under rear and frontal crash conditions of the vehicle and by agency of deformation of said object, longitudinal movement of the striker pin thereinto to a rearward limit position and a frontward limit position, respectively, whereat the striker plate contacts the striker pin to arrest further longitudinal movement of the striker pin.

3. A mounting system according to claim 2, wherein, when the striker pin is at the rearward limit position, the striker plate contacts the striker pin to arrest vertical movement of the striker pin, and wherein, when the striker pin is at the frontward limit position, the striker plate contacts the striker pin to arrest vertical movement of the striker pin.

4. A mounting system according to claim 1, wherein the design position of the striker pin is defined by the closed end of the slot.

5. A mounting system according to claim 1, wherein the latch member comprises a first latch hook pivotally mounted on the second portion of the object for selective movement between an engaged position and a disengaged position and wherein the latch-engaging member is a lug member which is adapted to be selectively, securely engaged by the first latch hook upon movement of the first latch hook from the disengaged position to the engaged position.

6. A mounting system according to claim 1, wherein the slot extends in an arcuate manner about the first pivot axis.

7. A seat assembly to be mounted on a vehicle having a front end, a rear end, a longitudinal axis extending between the front end and the rear end and a lateral axis arranged substantially transverse to the longitudinal axis, the seat assembly comprising:
a seat member including a support member having a first portion and a second portion; and
the mounting system of claim 3, in use with the seat member with the first portion of the support member defining the first portion of the object and the second portion of the support member defining the second portion of the object,
wherein the design position of the seat member is an occupiable position.

8. A seat assembly according to claim 7, wherein a first latch hook is adapted to move from its engaged position towards its disengaged position under frontal deformation of the seat assembly into a deformed configuration, and wherein a second latch hook is provided, the second latch hook being pivotally mounted on the second portion of the support member for selective movement between an engageable position, whereat it securely engages the lug member when the seat assembly is in its deformed configuration, and a disengaged position, whereat it is removed from engagement with the lug member.

9. A seat assembly according to claim 8, wherein said selective movement of the second latch hook is under control of an elongate slot formed through the first latch hook and a pin member rigidly extending from the second latch hook, the pin member engaging said elongate slot in lost motion sliding relation to effect movement of the second latch hook to its disengaged position upon movement of the first latch hook to its disengaged position and to effect movement of the second latch hook to its engageable position upon movement of the first latch hook to its engaged position.

10. A seat assembly according to claim 7, wherein the seat member includes a seat cushion portion and a seat back portion, each of the support member, the seat cushion portion and the seat back portion having respective design positions defined by the design position of the seat member.

11. A seat assembly according to claim 10, wherein the seat member defines a second pivot axis which, when the seat cushion portion is disposed at its design position, is aligned substantially laterally and disposed adjacent the rear end of the seat cushion portion, and wherein the seat member is adapted to provide for selective, reversible forward pivotal movement of the seat back portion, relative to the seat cushion portion and about the second pivot axis, from its design position to a collapsed position whereat it rests upon the seat cushion portion when the seat cushion portion is disposed at its design position.

12. A seat assembly according to claim 11, wherein the seat member is adapted to provide, when the seat back portion is disposed at its collapsed position for contemporaneous, selective, reversible forward pivotal movement of the support member, the seat back portion and the seat cushion portion about the first pivot axis to respective upfolded positions, whereat the seat cushion portion is orientated substantially vertically and the seat back portion is disposed substantially frontwardly from the seat cushion portion.

13. A seat assembly according to claim 12, wherein the support member is distinct from the seat cushion portion and the seat back portion and has the seat cushion portion and the seat back portion operatively connected thereto to provide for said contemporaneous, selective, reversible forward pivotal movement of the support member, the seat back portion and the seat cushion portion about the first pivot axis.

14. A seat assembly according to claim 13, wherein the second portion of the support member has the seat back portion pivotally connected thereto to provide for said selective, reversible forward pivotal movement of the seat back portion about the second pivot axis.

15. A seat assembly according to claim 14, wherein the seat cushion portion is detachably connected to the support member and is adapted for movement, independent of the seat back portion and the support member, between its design position and a storage position, which is relatively frontwardly disposed from the design position of the seat cushion portion and whereat the seat cushion portion is orientated substantially vertically.

16. A seat assembly according to claim 15, wherein, when the seat cushion portion is at its storage position, the seat member is adapted to provide for selective, reversible forward folding movement of the seat back portion about a lateral fourth pivot axis, disposed adjacent the second portion of the support member, from its design position to a fold-flat position whereat the seat back portion is nested rearwardly relative to the seat cushion portion and disposed in a substantially horizontal orientation.

17. A seat assembly according to claim 16, wherein the seat member further comprises a support tube, the support tube having, in use, a first end mounted on the vehicle for pivotal movement about the first pivot axis and a second end mounted to the seat cushion portion for pivotal movement of the seat cushion portion about a third pivot axis parallel to the first pivot axis, thereby to provide for said movement of the seat cushion portion between its design position and its storage position.

18. A seat assembly according to claim 16, wherein the support member is a tubular support member having an intermediate portion interconnecting the first portion and the second portion, wherein the intermediate portion extends substantially between the first pivot axis and the fourth pivot axis and wherein the first portion and the second portion rigidly extend, in the same direction from the intermediate portion in substantial alignment, respectively, with the first pivot axis and the fourth pivot axis, to respective terminii.

19. A seat assembly according to claim 18, wherein the seat member further comprises a pair of seat back mounting assemblies, comprising a first seat back mounting assembly and a second seat back mounting assembly, each of said pair of seat back mounting assemblies including a distal portion securely attached to the seat back portion and a proximal portion mounted to the support member for pivotal movement about the fourth pivot axis, to provide for said selective pivotal movement of the seat back portion about the fourth pivot axis.

20. A seat assembly according to claim 19, wherein the first seat back mounting assembly is pivotally mounted to the support member adjacent to the junction of the intermediate portion and the second portion and the second seat back mounting assembly is pivotally mounted to the support member adjacent to the terminus of the second portion.

21. A seat assembly according to claim 20, wherein the proximal portion of each seat back mounting assembly is a rotator arm and the distal portion is a seat back mounting bracket, the rotator arm and the seat back mounting bracket being mounted to one another for selective, relative pivotal movement about the second pivot axis, thereby to provide for said selective, reversible forward pivotal movement of the seat back portion about the second pivot axis.

22. A seat assembly according to claim 21, wherein a guide slot is formed through the rotator arm of the first seat back mounting assembly and a limit pin rigidly extends from the support member into said guide slot, the guide slot extending in an arcuate manner about the fourth pivot axis and circumscribing the movement of said rotator arm between a fold-flat position thereof, defined by the fold-flat position of the seat back portion, and a design position thereof, defined by the design position of the seat back portion.

23. A seat assembly according to claim 22, wherein said selective, reversible forward folding movement of the seat back portion about the fourth pivot axis is under control of a latch pawl, said latch pawl being mounted to the support member for pivotal movement between an engaged position, whereat it latchingly engages a corresponding pawl-receiving surface on the rotator arm of the first seat back mounting assembly to arrest movement of said rotator arm away from the design position thereof, and a disengaged position, whereat it is removed from contact with the pawl-receiving surface to permit movement of said rotator arm from its design position towards its fold-flat position.

24. A seat assembly according to claim 21, comprising a pair of rearward limit pins each projecting from a respective seat back mounting bracket and arranged to impinge upon the rotator arm to which said seat back mounting bracket is mounted upon pivotal movement of said seat back mounting bracket about the second pivot axis to a design position thereof, defined by the design position of the seat member, and arrest rearward pivotal movement of the seat back mounting bracket therebeyond.

25. A seat assembly according to claim 24, wherein said selective, reversible forward pivotal movement of the seat back portion about the second pivot axis is under control of a pair of rotatable stop pawls each being pivotally connected to a respective rotator arm for movement between an engaged position, whereat it engages a corresponding stop pawl-receiving surface on the seat back mounting bracket which is pivotally mounted to said each rotator arm, to arrest forward movement of said seat back mounting bracket away from its design position, and a disengaged position, whereat it is removed from contact with the stop pawl receiving surface to permit movement of said seat back mounting bracket towards a collapsed position thereof, defined by the collapsed position of the seat back portion.

26. A seat assembly according to claim 21, wherein the latch member is mounted to the second portion of the support member adjacent to the junction-of the second portion and the intermediate portion, and wherein the striker pin is mounted to the second portion of the support member adjacent its terminus.

27. A seat assembly according to claim 26, wherein the striker pin is mounted to the terminus of the second portion of the support member by a pair of spaced-apart containment plates rigidly connected to opposite ends of the striker pin, a respective one of said containment plates being mounted to said second portion of the support member adjacent its terminus.

28. A seat assembly according to claim 27, wherein the rotator arm of the second seat back mounting assembly is mounted to the support member for pivotal movement as aforesaid by being interposed between the pair of containment plates and journaled for rotation about a pivot shaft which rigidly extends between the containment plates in alignment with the fourth pivot axis.

29. A seat assembly according to claim 28, further comprising a stop pin rigidly extending between the containment plates and positioned to arrest rearward pivotal movement of the rotator arm of the second seat back mounting assembly beyond a design position thereof defined by the design position of the seat back portion.

30. A seat assembly according to claim 18, further comprising latching means for arresting longitudinal movement of the seat cushion portion relative to the seat back portion when the seat cushion portion is at its design position and the support member is at its design position.

31. A seat assembly according to claim 30, wherein the latching means comprises a first co-operating portion mounted on the seat cushion portion and a second co-operating portion mounted on the support member, the first co-operating portion and the second co-operating portion being adapted to engage one another in longitudinally-arresting relation upon said movement of the seat cushion portion to its design position.

32. A seat assembly according to claim 30, wherein the latching means comprises a third co-operating portion mounted on the seat cushion portion and a fourth co-operating portion mounted, in use, on the vehicle, the third co-operating portion and the fourth co-operating portion being adapted to engage one another in longitudinally-arresting relation upon said movement of the seat cushion portion to its design position.

* * * * *